(12) United States Patent
Bose et al.

(10) Patent No.: US 7,649,805 B2
(45) Date of Patent: Jan. 19, 2010

(54) DISPERSION EXTRACTION FOR ACOUSTIC DATA USING TIME FREQUENCY ANALYSIS

(75) Inventors: Sandip Bose, Chestnut Hill, MA (US); Henri-Pierre Valero, Belmont, MA (US); Shuchin Aeron, Brighton, MA (US)

(73) Assignee: Schlumberger Technology Corporation, Cambridge, MA (US)

( * ) Notice: Subject to any disclaimer, the term of this patent is extended or adjusted under 35 U.S.C. 154(b) by 29 days.

(21) Appl. No.: 11/854,405

(22) Filed: Sep. 12, 2007

(65) Prior Publication Data

US 2009/0067286 A1 Mar. 12, 2009

(51) Int. Cl.
 *G01V 1/00* (2006.01)
(52) U.S. Cl. ...................................................... 367/38
(58) Field of Classification Search ............. 367/25–32; 181/105, 122
See application file for complete search history.

(56) References Cited

U.S. PATENT DOCUMENTS

| | | | |
|---|---|---|---|
| 5,278,805 A * | 1/1994 | Kimball | 367/32 |
| 7,120,541 B2 | 10/2006 | Wang | |
| 2005/0254343 A1* | 11/2005 | Saiki et al. | 367/31 |
| 2006/0039238 A1* | 2/2006 | Mandal et al. | 367/31 |
| 2006/0120217 A1* | 6/2006 | Wu et al. | 367/32 |

OTHER PUBLICATIONS

Auger, et al., "Improving the readability of time-frequency and time scale representations by the reassignment method", IEEE, vol. 43, No. 5, May 1995, pp. 1068-1089.

Cheng, et al., "Elastic wave propagation in a fluid-filled borehole and synthetic acoustic logs", Geophysics, vol. 46, No. 7, Jul. 1980, pp. 1042-1053.

Combes et al., "Wavelets—time frequency methods and phase space", Proceedings of the International Conference, Marseille, France, Dec. 14-18, 1987, Springer-Verlag.

Deans, Stanley R., "The radon transform and some of its applications", Wiley-Interscience Publication, 1983, pp. 55-59.

(Continued)

*Primary Examiner*—Jack W. Keith
*Assistant Examiner*—Krystine Saito
(74) *Attorney, Agent, or Firm*—Helene Raybaud; James McAleenan; Jody Lynn DeStefanis

(57) ABSTRACT

This invention pertains to the extraction of the slowness dispersion characteristics of acoustic waves received by an array of two or more sensors by the application of a continuous wavelet transform on the received array waveforms (data). This produces a time-frequency map of the data for each sensor that facilitates the separation of the propagating components thereon. Two different methods are described to achieve the dispersion extraction by exploiting the time frequency localization of the propagating mode and the continuity of the dispersion curve as a function of frequency. The first method uses some features on the modulus map such as the peak to determine the time locus of the energy of each mode as a function of frequency. The second method uses a new modified Radon transform applied to the coefficients of the time frequency representation of the waveform traces received by the aforementioned sensors. Both methods are appropriate for automated extraction of the dispersion estimates from the data without the need for expert user input or supervision.

24 Claims, 12 Drawing Sheets

OTHER PUBLICATIONS

Ekstrom, Michael, P., "Dispersion estimation from borehole acoustic arrays using a modified matrix pencil algorithm", IEEE, 1996, pp. 449-453.

Gradshteyn, et al., "Table of Integrals, Series and Products", Academic Press, NY, p. 485.

Grossman, et al., "Decomposition of hardy functions into square integrable wavelets of constant shape", SIAM J. Math. Anal. vol. 15, No. 4, Jul. 1984, pp. 723-736.

Kimball, et al., "Semblance processing of borehole acoustic array data", Geophysics, vol. 49, No. 3, Mar. 1984, pp. 274-281.

Kimball, et al., "Shear slowness measurement by dispersive processing of the borehole flexural mode", Geophysics, vol. 63, No. 2, Mar.-Apr. 1998, pp. 337-344.

Lang, et al., "Estimating slowness dispersion from arrays of sonic logging waveforms", Geophysics, vol. 52, No. 4, Apr. 1987, pp. 530-544.

Paillet, et al., "Acoustic waves in boreholes", CRC, 1991, pp. 125-145.

Rioul et al., "Time-scale energy distributions: a general class extending wavelet transforms", IEEE Transactions on Signal Processing, vol. 40, No. 7, Jul. 1992, pp. 1746-1757.

Roueff, et al., "Dispersion estimation from linear array data in the time-frequency plane", IEEE Transactions on Signal Processing, vol. 53, No. 10, Oct. 2005, pp. 3738-3748.

Steele, Michael J., "Probability theory and combinatorial optimization", CBMS-NSF Regional Conference Series in Applied Mathematics, SIAM, pp. 88-89.

* cited by examiner

MODE TRACKING ON THE TIME FREQUENCY PLANE USING DATA ASSOCIATION

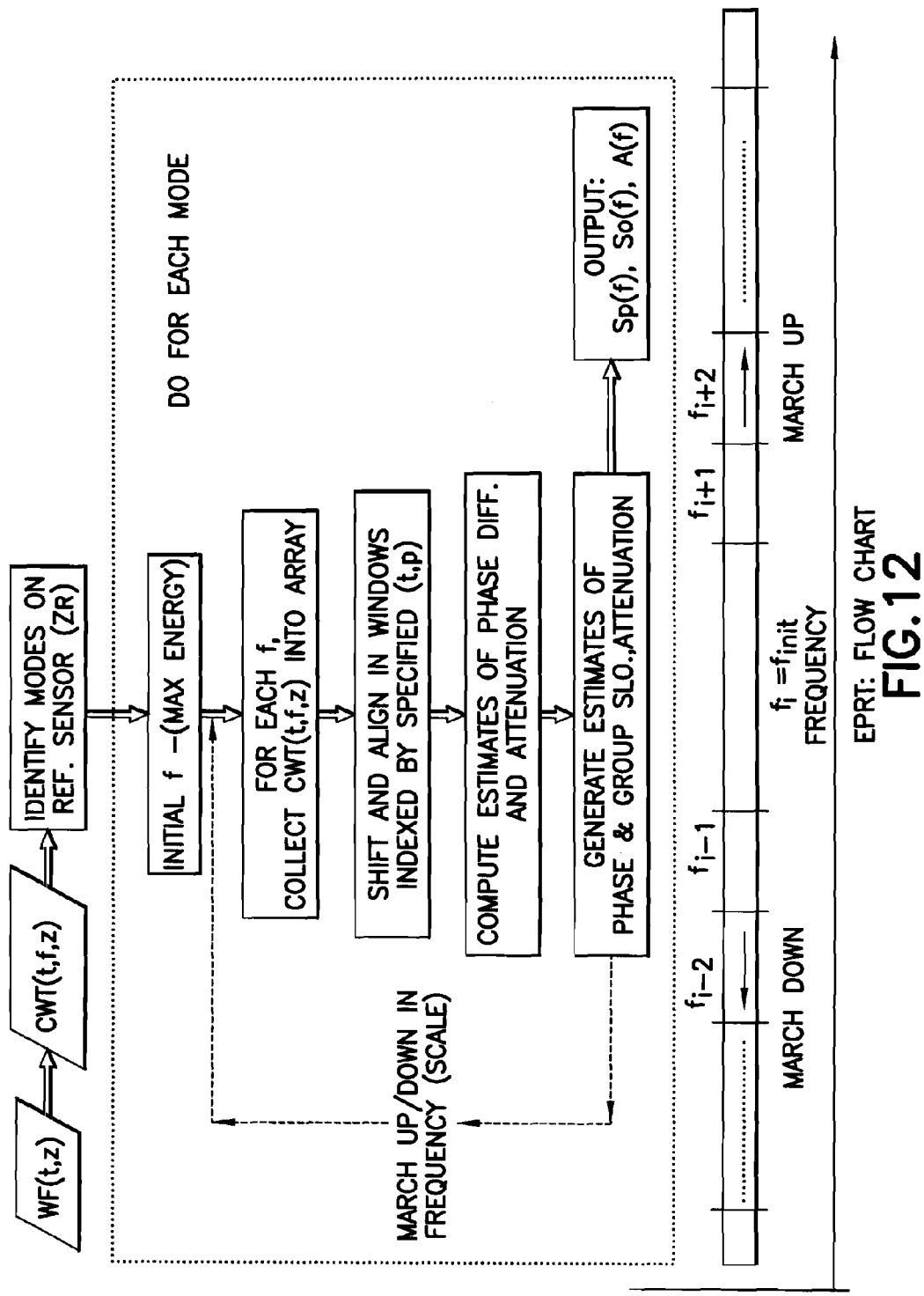
FIG. 12 EPRT: FLOW CHART

DISPERSION EXTRACTION FOR ACOUSTIC DATA USING TIME FREQUENCY ANALYSIS

FIELD OF THE INVENTION

This invention is generally related to acoustic data analysis, and more particularly to processing acoustic waveforms where there is dispersion (frequency dependent wave velocity and attenuation), including but not limited to acoustic analysis of materials and subsurface formations.

BACKGROUND OF THE INVENTION

Dispersive processing of borehole acoustic data is useful for the characterization and estimation of rock properties using borehole acoustic data containing propagating modes. It is both more complex and more informative than non-dispersive processing, where bulk velocities in the rock are measured without any frequency dependence. Perhaps the most common parameters used to describe the dispersion characteristics are the wavenumber, k(f), and the attenuation, A(f), both of which are functions of the frequency f and are of interest in the oil industry for characterizing the properties of reservoirs. The dispersion characteristics include the group and phase slowness (reciprocal of velocity) as a function of frequency linked to the wavenumber, k(f), as follows:

$$s_\phi(f) = \frac{1}{V_{phase}(f)} = \frac{k(f)}{f} \quad (1)$$

and $$s_g(f) = \frac{1}{V_{group}(f)} = \frac{dk(f)}{df} \quad (2)$$

These two quantities are not independent, and satisfy:

$$s_g = s_\phi + f \frac{ds_\phi}{df}. \quad (3)$$

One known class of dispersive processing solutions uses physical models which relate the rock properties around the borehole to predicted dispersion curves. Waveform data collected by an array of sensors is backpropagated according to the modeled dispersion curves, and the model is adjusted until there is good semblance among these backpropagated waveforms, thereby indicating a good fit of the model to the data. However, models are presently available for only simpler cases, and other physical parameters still need to be known. Further, there is a risk that biased results will be produced if there is model mismatch or input parameter error. Moreover, this class of solutions assumes the presence of only a single modeled propagating mode, and pre-processing steps such as time windowing and filtering may be desireable to isolate the mode of interest. These also require user input, and in some cases the results may be sensitive to the latter, requiring expert users for correctly processing the data.

One way to mitigate these drawbacks is to directly estimate the dispersion characteristics from logging data, i.e., without reference to particular physical models. Not only can this be used for quantitative inversion of parameters of interest, but the dispersion curves carry important information about the acoustic state of the rock and are important tools for interpretation and validation. Moreover, in order to be part of a commercial processing chain, the dispersion estimation method should be capable of operation in an automated unsupervised manner and in particular the accuracy of the results should not depend on input from highly skilled users. One technique of estimating dispersion characteristics directly from data collected by an array of sensors, for example, in seismic applications, is to use a 2D FFT, also called the f-k (frequency wavenumber) transform. This technique indicates the dispersion characteristics of propagating waves, both dispersive and non-dispersive. However, its effectiveness is limited to large arrays of tens of sensors. For applications with fewer sensors, such as commonly found in sensor arrays (2-13 sensors) on borehole wireline and LWD tools, this technique may lack the necessary resolution and accuracy to produce useful answers.

A high resolution method appropriate for shorter arrays was developed using narrow band array processing techniques applied to frequency domain data obtained by performing an FFT on the array waveform data. However, while this is an effective tool for studying dispersion behavior in a supervised setting with user input, it produces unlabelled dots on the f-k plane frequency by frequency and therefore may not be entirely suitable for deployment as an automated unsupervised processing method. Moreover, the operation of the FFT washes out the information pertaining to the time of arrival of various propagating modes, thereby compromising performance and the effectiveness of interpretation, especially for weaker modes of interest overlapping with stronger ones in frequency domain.

A parametric method for estimating dipole flexural dispersion is known which can be used for automated dispersion extraction. However this is limited to the particular (flexural) dispersive mode, and cannot be readily extended to the general case. Moreover, it is a one-component extraction technique.

Recently, a new algorithm has been proposed using time frequency analysis with continuous wavelet transform along with beamforming methods. However, the algorithm does not account for attenuation and has a propagation model with a pure phase response. In real world applications, many modes of interest are attenuative and the attenuation is therefore a key parameter of interest. Further, the phase response is estimated using a 2-D search over delays and phase corrections applied to the original data, for each of which, a time-frequency map is generated. Extending this approach to include attenuation would make it a 3-D search, which would be relatively computationally intensive for commercial real time applications. Finally, the use of this approach as well as the criterion of maximum energy for identifying propagating modes on the time-frequency maps generated above may obscure weak modes of interest by stronger in-band interfering modes even when they are separated in time.

SUMMARY OF THE INVENTION

In accordance with one embodiment of the invention, a method of dispersion extraction for acoustic data comprises the steps of: receiving a time series of acoustic data associated with a plurality of sensors having different transmitter-receiver spacings; generating a plurality of time-frequency representations from the received time series; identifying a characteristic feature in said time-frequency representations; selecting at least one frequency; defining a kernel comprising: estimating a time location of the characteristic feature at the selected frequency; associating a corresponding characteristic feature for ones of the spacings at the selected frequency; fitting at least a segment of a line through at least some of the time locations of the associated characteristic features, plotted against the corresponding spacings; estimating group slowness at the selected frequency based at least in-part on an indication of fitted line segment slope; estimating a phase difference between sensors; estimating an attenuation between sensors; using the phase difference and the estimated group slowness to estimate phase slowness; and repeating the kernel for other frequencies of interest, obtaining a dispersion curve comprising the group slowness, the phase slowness, and the attenuation as a function of frequency, and providing the dispersion curve in tangible form.

In accordance with another embodiment of the invention, a method of dispersion extraction for acoustic data comprises the steps of: receiving a time series associated with a plurality of sensors; generating a time-frequency representation for each sensor; selecting a reference sensor; identifying a characteristic feature in the time frequency representation for the reference sensor; estimating time locations across frequency of the characteristic feature; selecting an initial frequency at which energy is greater than a threshold value over said time locations; defining a kernel comprising: collecting time frequency coefficients at the selected frequency for the sensors into a representation of data indexed by time and sensor; selecting time windows centered on a set of positions in a local neighborhood of the time location at the selected frequency; selecting a set of test moveouts for ones of the time windows corresponding to expected range of group slowness; shifting and aligning the representation of coefficient data in the window corresponding to the test moveout and window positions; computing estimates of phase difference and attenuation across the representation of shifted and aligned data for the test moveouts and window positions; using the estimated phase difference and attenuation to perform a modified stacking operation on the representation of shifted and aligned data for the test moveouts and window positions to produce an output representation for a plurality of values of time position and moveout; finding a maximum peak of the output representation and using the corresponding moveout to estimate the group slowness; using a corresponding value of the computed estimate of the phase difference along with the group slowness to generate an estimate of the phase slowness; setting a corresponding value of the computed estimate of attenuation as an attenuation estimate; iteratively increasing frequency from the selected initial frequency comprising: selecting a higher frequency; constraining the moveout based on the previous computed value of the group slowness; repeating the kernel for the selected higher frequency until a final highest frequency is reached or when the maximum computed semblance falls below a specified threshold; iteratively decreasing frequency from the selected initial frequency comprising selecting a lower frequency; constraining the moveout based on the previous computed value of the group slowness; repeating the kernel for the selected lower frequency until a final lowest frequency is reached or when the maximum computed semblance falls below a specified threshold; obtaining a dispersion curve comprising the group slowness, the phase slowness, and the attenuation as a function of frequency; and providing the dispersion curve in tangible form.

In accordance with another embodiment of the invention, apparatus for dispersion extraction for acoustic data comprises: a sonic logging tool operable to generate a time series of acoustic data associated with a plurality of sensors having different transmitter-receiver spacings; an analyzer operable to: generate a plurality of time-frequency representations from the time series; identify a characteristic feature in said time-frequency representations; program code operable to select at least one frequency; define a kernel, including: estimating a time location of the characteristic feature at the selected frequency; associating the corresponding characteristic feature for ones of the spacings at the selected frequency; fitting at least a segment of a line through at least some of the time locations of the associated characteristic features;

estimating group slowness at the selected frequency based at least in-part on slope of the fitted line segment; estimating a phase difference between sensors; estimating attenuation between the sensors; using the phase difference and the group slowness to estimate the phase slowness; and repeating the kernel for other frequencies of interest, obtaining a dispersion curve comprising the group slowness, the phase slowness, and the attenuation as a function of frequency, and storing the dispersion curve in memory.

In accordance with another embodiment of the invention, apparatus for dispersion extraction for acoustic data comprises: a sonic logging tool operable to generate a time series associated with a plurality of sensors; an analyzer operable to: generate a time-frequency representation for ones of the sensors; select a reference sensor; identify a characteristic feature in the time frequency representation for the reference sensor; determine time locations across frequency of the said characteristic feature; select an initial frequency at which energy is maximum over the said time locations; define a kernel, including: collecting time frequency coefficients at the selected frequency for ones of the sensors into a representation of data indexed by time and sensor; selecting time windows centered on a set of positions in a local neighborhood of the time location at the selected frequency; selecting a set of test moveouts for ones of the time windows corresponding to expected range of group slowness; shifting and aligning the representation of coefficient data in the window corresponding to ones of the test moveout and window positions; computing estimates of phase difference and attenuation across the representation of shifted and aligned data for ones of the test moveouts and window positions; using the estimated phase difference and attenuation to perform a modified stacking operation on the representation of shifted and aligned data for ones of the test moveouts and window positions to produce an output representation for values of time position and moveout; finding a maximum peak of the output representation and using a corresponding moveout to estimate group slowness; using a corresponding value of the computed estimate of the phase along with group slowness to generate an estimate of phase slowness; setting a corresponding value of the computed estimate of attenuation as an attenuation estimate; iteratively increasing frequency from the selected initial frequency comprising selecting a higher frequency; constraining the moveout based on the previous computed value of the group slowness; repeating the kernel for the selected higher frequency until a final highest frequency is reached or when the maximum computed semblance falls below a specified threshold; iteratively decreasing frequency from the selected initial frequency comprising selecting a lower frequency; constraining the moveout based on the previous computed value of the group slowness; repeating the kernel for the selected lower frequency until a final lowest frequency is reached or when the maximum computed semblance falls below a specified threshold; obtaining a dispersion curve comprising the group slowness, the phase slowness, and the attenuation as a function of frequency; and providing the dispersion curve in tangible form.

The inventive technique advantageously allows the extraction of the group slowness dispersion along with the phase slowness dispersion and attenuation from the array waveform data without the use of any physical model by exploiting the time frequency localization of the propagating modes at each sensor as well as the continuity of the dispersion curve as a function of frequency. In contrast with at least some prior art techniques, in at least one embodiment of this invention the time-frequency mapping is computed once and, using the continuity of the dispersion curves, a restricted 1-D search is utilized over delays over the wavelet coefficients followed by closed form estimation of the best corresponding phase correction and attenuation. Moreover, the criterion of semblance that is effective in identifying weak modes so long as they are non-overlapping in the time-frequency plane can be utilized. As a result, an improved and practical means can be provided for directly extracting dispersion characteristics from data collected by a relatively short array of sensors.

The invention has practical application for the processing of borehole acoustic data dominated by dispersive borehole modes using logging-while-drilling and wireline tools, but could also be used in situations where dispersion exists and needs to be estimated. These could include, for example, the processing of surface waves such as ground roll in seismic data and the processing of dispersive Lamb modes with ultrasonic data for non-destructive evaluation. These dispersion characteristics can then be used to extract information of interest such as rock compressional and shear velocities, radial variation, anisotropy etc. In the Detailed Description which follows a method to estimate the dispersion characteristics (group and phase velocity and attenuation as a function of frequency) of one or more propagating modes using an array of two or more sensors will be described. While the examples provided herein are directed towards borehole applications, as described above, the methods and apparatuses described herein may also be applied to the characterization of other materials such as cement, and human or animal tissue.

Further features and advantages of the invention will become more readily apparent from the following detailed description when taken in conjunction with the accompanying Drawing.

BRIEF DESCRIPTION OF THE DRAWING

FIG. 9 illustrates operation of the Exponential Projected Radon Transform (EPRT) on the complex coefficients of the CWT of array data at a particular scale a.

FIG. 12 illustrates a flowchart of the EPRT method.

DETAILED DESCRIPTION

In accordance with the invention, dispersion curves are produced by an analyzer unit from acoustic data gathered by a borehole logging tool. Regardless of the embodiments illustrated, the logging tool may be of a wireline type, logging while drilling type, or any other type. Further the transmitter may be used to excite a dipole, monopole, quadrupole or any other multipole borehole acoustic mode. It should also be noted that seismic and borehole seismic data may be utilized, since both can contain dispersive arrivals. Each "sensor" includes a source (one or more transmitters) and a receiver (one or more associated hydrophones). For example, one transmitter and eight receivers constitute a set of eight sensors. Characteristic features of a sensor include the type of acoustic disturbance emitted by the source, and the distance (spacing) between the source and receiver.

Figure 1:
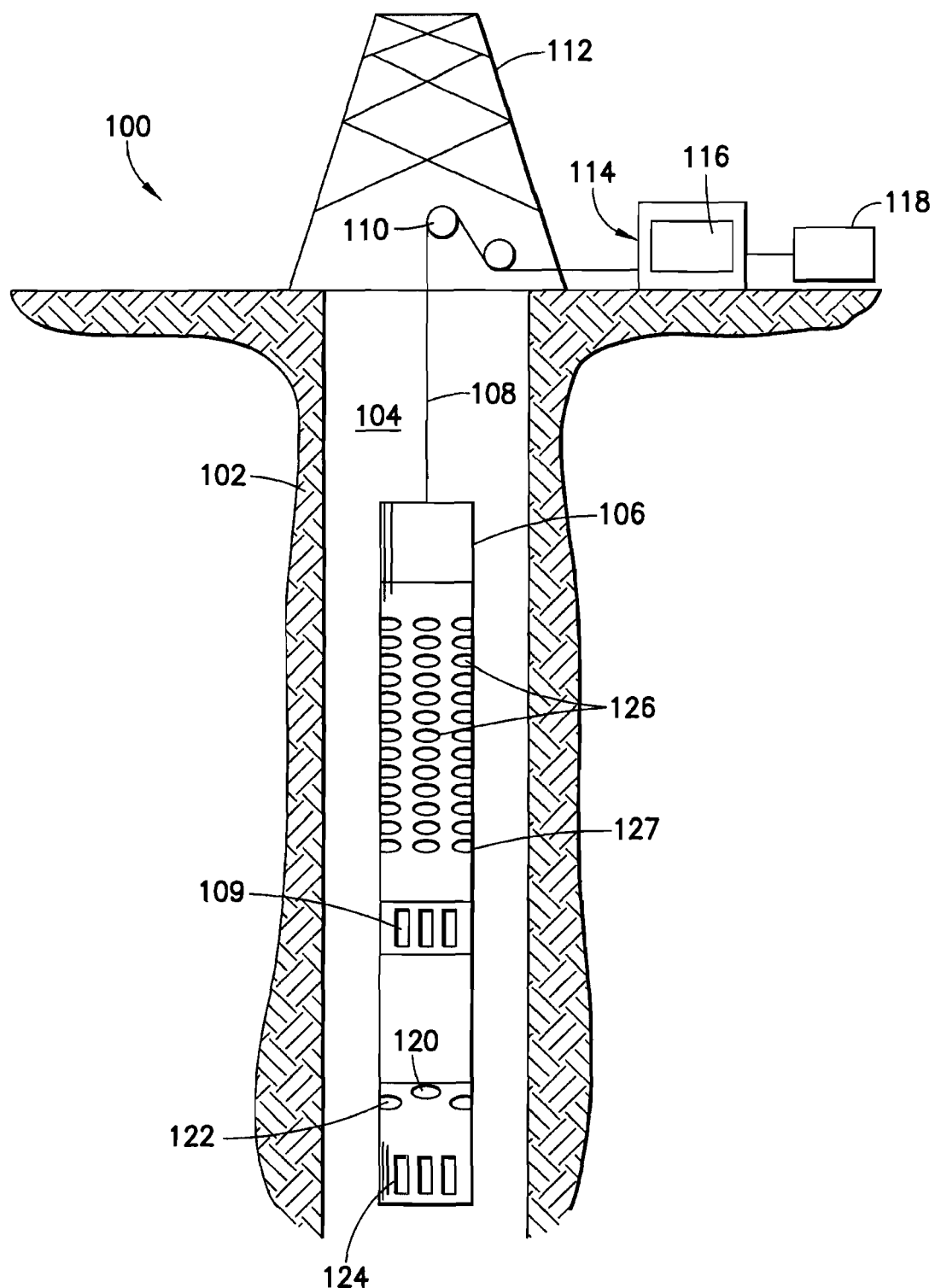
FIG. 1 illustrates a sonic logging tool with an analyzer unit.

FIG. 1 illustrates one example of a logging tool (106) used to acquire data from which dispersion curves will be extracted. The tool has a plurality of receivers and transmitters. The illustrated logging tool (106) also includes multipole transmitters such as crossed dipole transmitters (120, 122) (only one end of dipole (120) is visible in FIG. 1) and monopole transmitters (109) (close) and (124) (far) capable of exciting compressional, shear, Stoneley, and flexural waves. A plurality of receivers is arranged on the logging tool (106), spaced from the transmitters. In particular, the logging tool includes thirteen spaced receiver stations, each receiver station comprising multiple receiver hydrophones (126) mounted azimuthally at regular intervals around the circumference of the tool. With thirteen receivers (126) at each receiver station, there are a total of one-hundred and four receiver elements. Other configurations, such as a Digital Sonic Imaging (DSI) tool with four receivers at each of eight receiver stations, or incorporating other multipole sources such as quadrupole, are also possible. The use of a plurality of receivers and transmitters results in improved signal quality and adequate extraction of the various borehole signals over a wide frequency band It is noted that the distances and number of receivers and transmitters shown in this example are provided as exemplary only and are not intended to be limiting; other configurations may be employed.

During operation of the logging system (100), the subsurface formation (102) is traversed by the borehole (104) which may be filled with drilling fluid or mud. The logging tool (106) is suspended from an armored cable (108) and may have optional centralizers (not shown). The cable (108) extends from the borehole (104) over a sheave wheel (110) on a derrick (112) to a winch forming part of surface equipment, which may include an analyzer unit (114). Well known depth gauging equipment (not shown) may be provided to measure cable displacement over the sheave wheel (110). The tool (106) may include any of many well known devices to produce a signal indicating tool orientation. Processing and interface circuitry within the tool (106) amplifies, samples and digitizes the tool's information signals for transmission and communicates them to the analyzer unit (114) via the cable (108). Electrical power and control signals for coordinating operation of the tool (106) may be generated by the analyzer unit (114) or some other device, and communicated via the cable (108) to circuitry provided within the tool (106). The surface equipment includes a processor subsystem (116) (which may include a microprocessor, memory, clock and timing, and input/output functions—not separately shown), standard peripheral equipment (not separately shown), and a recorder (118). The tool (106) also includes a set of instructions that, when executed, provide a series of dispersion curves extracted from data at each depth. The logging tool (106) is representative of any logging device that may be used in accordance with principles described herein. It will be understood by those of skill in the art having the benefit of this disclosure that other suitable logging device, including LWD devices, can also be utilized.

Review of Complex Continuous Wavelet Transform

The continuous wavelet transform is a transformation allowing the decomposition of an arbitrary time or space dependent signal, s(p), into elementary contributions of functions called wavelets obtained by dilation and translation of a "mother" or analyzing wavelet g(p). In this document the terms "waveforms," "signal," "function," and "time series" are used to refer to data collected by any of a set of receivers at a plurality of sampling points in time or space. Note that the data can be viewed as a series (e.g., "time series") that represents the evolution of the observed quantity as a function of time (or space), when plotted out versus time (or space), as tracing out the shape of the acoustic waves received (e.g., "waveform"), and also as containing information to be extracted (e.g., "signal"). For the purposes of this description, let s(p) be an arbitrary time or space dependent signal and g(p) the chosen complex and progressive analyzing wavelet, necessary to study wave propagation phenomena, and let p be the time variable. The continuous wavelet transform S(b,a) of a function s(p) is the scalar product of this signal by the dilated (contracted) and translated wavelets family, g, such as $$T^b D^a [g(p)] = a^{-1/2} g\left(\frac{p-b}{a}\right). \quad (3)$$

In the case of $L_2$ normalization this yields:

$$S(b,a) = <T^b D^a [g(p)], s(p)> = a^{-1/2} \int s(p) \bar{g}\left(\frac{p-b}{a}\right) dp \quad (4)$$

while for $L_1$ normalization the expression can be represented as:

$$S(b,a) = <T^b D^a [g(p)], s(p)> = a^{-1} \int s(p) \bar{g}\left(\frac{p-b}{a}\right) dp \quad (5)$$

where $\bar{g}$ is the complex conjugate of g dilated in time by a (a>0) and translated in time by b, homogeneous to the time in this case, (b ∈ R). a and b are respectively the scale (or dilation) parameter, that can be interpreted like a zoom, and the translation parameter. Small dilations will be related to the high frequencies and vice versa. In order to correctly define and give a physical meaning to the phase of the wavelet coefficients, the analyzing wavelet should satisfy the analytic or progressive property (i.e.: $\hat{g}(\omega)=0$, for negative (spatial or time) frequency components $\omega<0$). The calculation of the wave fronts of different wave contributions and their spectral components can be performed precisely without artifacts or interferences due to the absence of Fourier components on the negative axis.

There exists some flexibility in the choice of the analyzing wavelet, but it should preferably satisfy the admissibility condition deduced from the isometric property of the transform in the following sense: there exists for every s(t) a constant $c_g$ depending only on the wavelet g such that:

$$\int |s(t)|^2 dt = c_g^{-1} \int \int |S(b,a)|^2 \frac{da\,db}{a^2}, \quad (6)$$

and $$c_g = 2\pi \int \frac{|\hat{g}(\omega)|^2}{|\omega|} d\omega < \infty. \quad (7)$$

$\hat{g}$ is the Fourier transform of g with $\omega$ as the dual variable of the time t and the inequality on the right is the admissibility condition. It follows that g is of zero mean ($\int g(t)dt=0$ or $\hat{g}(0)=0$). If this condition is satisfied, there exists an inversion formula which reconstructs the analyzed signal (Grossmann, A. and Morlet, J., 1984, Decomposition of Hardy functions into square integrable wavelets of constant shape, *SIAM—J. Math. Anal.*, 15, 723-736).

$$s(t) = \text{Re}\left[c_g^{-1} \int \int S(b,a) a^{-1/2} g\left(\frac{t-b}{a}\right) \frac{da\,db}{a^2}\right] \quad (8)$$

where Re[.] represents the real part.

It can be shown that s(t) can also be obtained by a simple inversion formula involving only a one-dimensional integral over the dilation parameter:

$$s(t) = \text{Re}\left[k_g^{-1} \int S(t,a) \frac{da}{a^{3/2}}\right], \quad (9)$$

provided that the analyzing wavelet satisfies the following admissibility condition:

$$\int \frac{|\hat{g}(\omega)|}{|\omega|} d\omega < \infty, \quad (10)$$

and $$k_g = 2\pi \int \frac{\hat{g}(\omega)}{\omega} d\omega. \quad (11)$$

Since the CWT is non-orthogonal, $<g(b,a), g(b',a')> \neq 0$. There exists a reproducing kernel $N_g$ defined from equations (4) and (7) as:

$$N_g(b,a,v,u) = c_g^{-1} <g(b,a), g(v,u)>. \quad (12)$$

Let $$N_g(v,u;0,1) = c_g^{-1} <T^v D^u g, g>. \quad (13)$$

$N_g$ verifies:

$$N_g(v, u; b, a) = N_g\left(0, 1; \frac{b-v}{u}, \frac{a}{u}\right). \qquad (14)$$

$N_g$ is then a function of scale ratio $$\frac{a}{u}$$

with a distance defined in scale ratio $$\frac{b-v}{u}.$$

It reflects the coherence of the wavelet coefficient in the half-plane (b,a) (time-scale resolution of the wavelet). Its modulus $|N_g|$ has a maximal value when the pairs $\{b,a\}=\{v,u\}$ and decays quickly when the distance of $\{b,a\}$ from $\{v,u\}$ increases, it means $$\frac{a}{u} \approx 1, \frac{b-v}{u} \square 1.$$

A progressive analyzing wavelet such as a Morlet type in which $$g(t) = \exp(i\omega_0 t)\exp\left(\frac{-t^2}{2\beta^2}\right),$$

with $\omega_0=2\pi$, $\beta=1$ yielding $\hat{g}(\omega)\approx 0$ for $\omega<0$ is selected. It is recognized that the Morlet wavelet is not a true wavelet in that its integral is not zero. However, for a large enough $\omega_0$ (in practice larger than 5), the integral of the Morlet wavelet is small enough that it can be used numerically as if it were a wavelet (Grossmann, A., Kronland-Martinet, R., Morlet, J., 1989, Reading and understanding continuous wavelet transform. *Wavelet, Time-frequency Methods and Phase Space*, Ed. J. M. Combes, A. Grossmann, P. Tchamitchian, Springer-Verlag, Berlin). Denoting $$a' = \frac{a}{u} \text{ and } b' = \frac{b-v}{u},$$

and using results from Gradshteyn, I. S. and Ryzhik, I. M., 1990, *Table of Integrals, Series and Products*, Academic Press, New York, the modulus and the phase of the reproducing kernel has the explicit form:

$$|N_g(0, 1; b', a')| = \frac{\beta}{c_g}\sqrt{\frac{2\pi a'}{1+a'^2}} \exp\left(-\frac{1}{2}\frac{\omega_0\beta^2(a'-1)^2 + \frac{b'^2}{\beta^2}}{1+a'^2}\right) \qquad (15)$$

$$\arg[N_g(0, 1; b', a')] = \frac{\omega_0 b'(a'+1)}{1+a'^2}$$

It follows that:

$$|N_g(v, u; b, a)| = \frac{\beta}{c_g}\sqrt{\frac{2\pi u a}{u^2+a^2}} \exp\left(-\frac{1}{2}\frac{\omega_0\beta^2(a-u)^2 + \frac{(v-b)^2}{\beta^2}}{u^2+a^2}\right); \qquad (16)$$

$$\arg[N_g(v, u; b, a)] = \frac{\omega_0(b-v)(u+a)}{u^2+a^2}$$

From equations (4) and (7), wavelet coefficients satisfy the reproducing equation:

$$S(v, u) = \int S(b, a) N_g(v, u, b, a) \frac{db\,da}{a^2}. \qquad (17)$$

This allows the use of the interpolation formula introduced by A. Grossmann (Grossmann, A., Kronland-Martinet, R., Morlet, J., 1989, Reading and understanding continuous wavelet transform. *Wavelet, Time-frequency Methods and Phase Space*, Ed. J. M. Combes, A. Grossmann, P. Tchamitchian, Springer-Verlag, Berlin), to reconstruct an approximate value of the CWT from the value of the Discrete Wavelet Transform (DWT).

Wavelet Transform Local Modulus Maxima

As will be described in greater detail below, the local maximum (plural maxima) of the wavelet transform modulus can be used to implement the inventive technique. For the purposes of this description, local extrema of the wavelet transform of s(t), is any point $(a_0,t_o)$ such that $$\frac{\partial S(a_0, t_o)}{\partial t} = 0. \qquad (18)$$

The local maxima of the wavelet transform of s(t), is any point $(a_0,t_o)$ such that when t belongs to either the right of the left neighborhood of $t_o$, $|S(a_0,t)|<|S(a_0,t_0)|$ and when t belongs to the other side of the neighborhood of $t_o$, $|S(a_0,t)|\leq|S(a_0,t_0)|$. The maxima line of the wavelet transform is any connected curve in the scale space (a,t) along which the points are local maxima of the wavelet transform. A local maximum $(a_0,t_o)$ of the wavelet transform is strictly maximum either on the right or the left side of the $t_0$. It should be noted that the term "local maximum" of the wavelet transform may be used to refer to a local maximum of the wavelet transform modulus in order to simplify the explanation.

Reassigned Scalogram

A "reassigned scalogram" approach may be useful to separate components which are too close in the time-scale plane by pre-processing, i.e., before applying the dispersion extraction methods described below. A brief description is given here, and a more general description can be found in Auger, F., and Flandrin, P., 1995, Improving the readability of time frequency time-scale representation by the reassignment method: IEEE Trans. Sig. Proc., 43, No. 5, 1068-1089. The reassignment principle can be applied to time-scale representations of the affine class (O. Rioul and P. Flandrin, Time-scale energy distributions: a general class extending wavelet transforms, *IEEE Trans. Signal Process.*, SP-40(7), 1746-1757, 1992). A widely used member of this class is the scalogram, which is the squared modulus of the continuous wavelet transform:

$$SC_s^g(t, a) = |W_s^g(t, a)|^2 \text{ with} \tag{19}$$

$$W_s^g(t, a) = \frac{1}{\sqrt{a}} \int_{-\infty}^{+\infty} s(u) \tilde{g}\left(\frac{u-t}{a}\right) du$$

where g(t) is the mother wavelet described previously. The scalogram results from an affine smoothing of the Wigner Ville distribution and is defined as:

$$SC_s^g(t, a) \int\int W_s(v, \xi) W_g\left(\frac{v-t}{a}, a\xi\right) \frac{dv d\xi}{2\pi} \tag{20}$$

where $W_s$ ($\square,\square$) and $W_g$ ($\square,\square$) denote the Wigner-Ville distributions of s and g respectively. As evidenced by this expression, $SC_s^g(t, a)$ can be interpreted as the summation of a whole set of energy measures $W_s(v, \xi)$ contained within a time frequency domain delimited by $$W_g\left(\frac{v-t}{a}, a\xi\right).$$

Instead of assigning this number to the geometric center of this domain, which does not depend on the analyzed signal, it may be assigned to the center of gravity, defined by:

$$\hat{t}(t, a) = \frac{1}{SC_s^g(t, a)} \int\int v W_s(v, \xi) W_g\left(\frac{v-t}{a}, a\xi\right) \frac{dv d\xi}{2\pi} \tag{21}$$

$$\hat{\omega}(t, a) = \frac{\omega_o}{\hat{a}(t, a)}$$

$$= \frac{1}{SC_s^g(t, a)} \int\int \xi W_s(v, \xi) W_g\left(\frac{v-t}{a}, a\xi\right) \frac{dv d\xi}{2\pi}$$

The resulting reassigned scalogram, defined as:

$$\widetilde{SC}_s^g = \int\int SC_s^g(t, a) \delta(t - \hat{t}_s(t, a), a' - \hat{a}_s(t, a)) \frac{a'^2 dt da}{a^2} \tag{22}$$

benefits both from the smoothing performed by the mother wavelet, and from the reassignment, which refocuses the scalogram on the squeezed signal description given by the Wigner-Ville distribution.

From a computational point of view, the local centroids can be computed efficiently by means of two additional wavelet transforms, using two particular mother wavelets:

$$\hat{t}_s(t, a) = t + \text{Re}\left\{\frac{aW_s^{tg}(t, a)}{W_s^g(t, a)}\right\} \tag{23}$$

$$\hat{\omega}_s(t, a) = \frac{\omega_o}{\hat{a}_s(t, a)} = -\text{Im}\left\{\frac{W_s^{dg}(t, a)}{aW_s^g(t, a)}\right\}$$

Several mother wavelet functions can be used. One of them is the Morlet wavelet also described previously and defined as follows:

$$g(t) = \frac{1}{\sqrt{\sigma}} e^{\frac{-t^2}{2\sigma^2}} e^{i\omega_o t} \tag{24}$$

In that case, where dg(t) represents the derivative of the mother wavelet with respect to time, $$dg(t) = \frac{-tg(t)}{\sigma^2} + i\omega_o g(t) \text{ and} \tag{25}$$

$$W_s^{dg}(t, a) = -\left[\frac{W_s^{tg}(t, a)}{\sigma^2} + i\omega_o W_s^g(t, a)\right]$$

Only $W_s^g(t,a)$ and $aW_s^{tg}(t,a)$ need to be computed, because using the expression in equation (21) yields:

$$\hat{\omega}_s(t, a) = \frac{\omega_o}{\hat{a}_s(t, a)} = \frac{\omega_o}{a} + \frac{1}{a^2\sigma^2} \text{Im}\left\{\frac{aW_s^{tg}(t, a)}{W_s^g(t, a)}\right\} \tag{26}$$

Computer algorithms can therefore be generated from the discrete-time versions of the following expressions:

$$W_s^g(t, a) = \sqrt{\frac{|\omega|}{\omega_o \sigma}} \int_{-\infty}^{+\infty} s(t+\tau) e^{\frac{-\omega^2 \tau^2}{2\omega_o^2 \sigma^2}} e^{-i\omega\tau} d\tau \tag{27}$$

$$aW_s^{tg}(t, a) = \sqrt{\frac{|\omega|}{\omega_o \sigma}} \int_{-\infty}^{+\infty} \tau s(t+\tau) e^{\frac{-\omega^2 \tau^2}{2\omega_o^2 \sigma^2}} e^{-i\omega\tau} d\tau$$

with $a=\omega_0/\omega$. Since the Gaussian analyzing window used in these expressions depends on the frequency (or scale) parameter, FFT algorithms cannot be used, resulting in much slower algorithms. It should be emphasized that $\omega_o$ and $\sigma$ only appear through their product $\omega_o\sigma$, which is the only degree of freedom of this representation. Increasing this parameter improves the frequency resolution and reduces the time resolution. The techniques described herein can be applied in the same manner on the reassigned scalogram.

Dispersion Extraction From Wavelet Domain
Problem Statement

It is useful to estimate the group and phase velocity of propagating components of acoustic data collected by an array of sensors. Such acoustic data could be acquired in a variety of ways, including but not limited to borehole acoustic tools, both wireline and LWD, and seismic tools. In the illustrated example, the only assumption made about the data is that it includes the superposition of one or more propagating components along with noise. Each of these components could exhibit both attenuation and dispersion, and moreover could overlap with other components in time or frequency or both.

The approach described here is based on the use of the complex continuous wavelet transform (CWT), such as described in the previous section. The wavelet transform maps a one dimensional signal into a two dimensional (time-frequency) plane of coefficients. This increase in dimensionality allows a better analysis and interpretation of the signal and a better separation of the various components. Thus, with real physical signals, components are often resolved on the time-frequency plane and can be separately reconstructed even when they do not separate in time or frequency. For the same reason, it is often possible to effectively analyze the received signals using a single mode approach by operating in the time-frequency or time-scale domain. In the embodiment described below there is one propagating component exhibiting dispersive and attenuative behavior. An example of an attenuative component would be a leaky borehole mode, i.e., one that radiates into the formation.

For two sensors on an array, the Fourier transform of the signal received at the second sensor in terms of that at the first sensor can be expressed as follows:

$$\hat{s}_2(f) = \hat{s}_1(f) e^{-2i\pi\delta k(f)} e^{-\delta A(f)}, \qquad (28)$$

where $k(f)$ and $A(f)$ are respectively the wavenumber and the attenuation as functions of frequency and $\delta$ is the inter-sensor spacing. Note that in this case it is assumed that the signal $s_1$ arrives first (this is not a limitation however; if signal $s_2$ arrives first, equation (28) still holds but with negative values for $k(f)$ and $A(f)$). It is possible to express equation (28) linking the signals 1 and 2 in the continuous wavelet domain. The continuous wavelet transform can be expressed in Fourier domain as follows:

$$S(a,b) = \int_{-\infty}^{+\infty} \tilde{g}^*(af) e^{2i\pi bf} \tilde{s}(f) df, \qquad (29)$$

with $\tilde{g}^*$ the complex conjugate of the Fourier transform of the analyzing mother wavelet and $\tilde{s}$ the Fourier transform of the signal to analyze. Note that the normalization coefficient has not been included for simplicity. Applying the wavelet transform to the equation (28) gives $$S_2(a,b) = \int_{-\infty}^{+\infty} \tilde{g}^*(af) e^{2i\pi bf} \tilde{s}_1(f) e^{-2i\pi\delta k(f)} e^{-\delta A(f)} df \qquad (30)$$

which can be simplified as $$S_2(a,b) = \int_{-\infty}^{+\infty} \tilde{g}^*(af) \tilde{s}_1(f) e^{2i\pi f\left[b - \frac{\delta k(f)}{f}\right]} e^{-\delta A(f)} df \qquad (31)$$

Figure 2A:
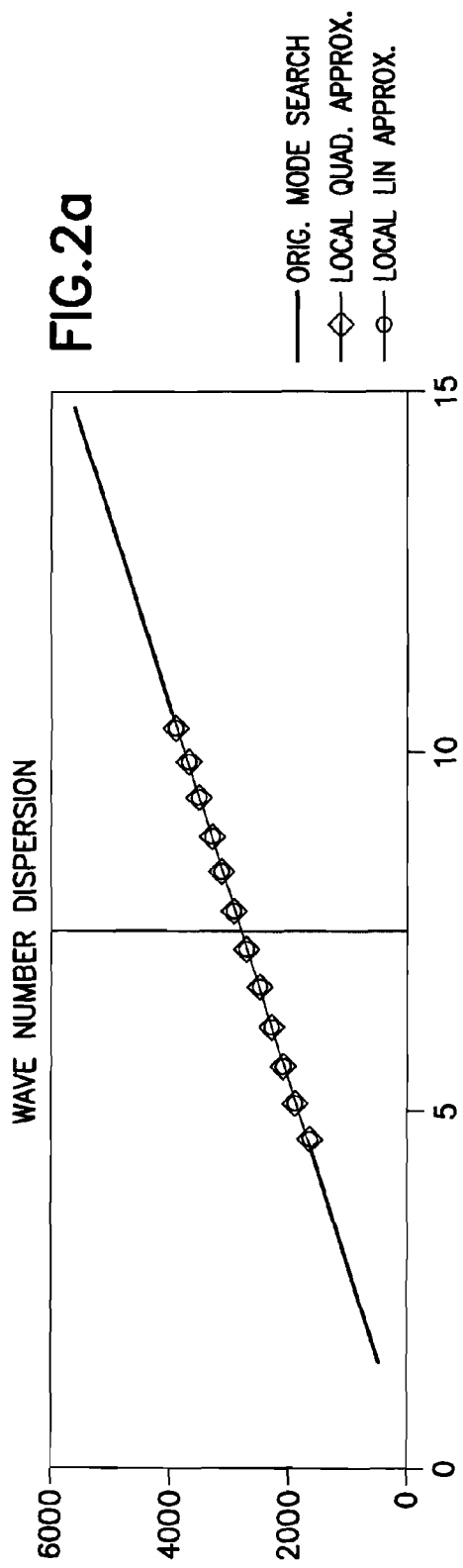
FIGS. 2a and 2b illustrate the efficacy of local Taylor expansions of orders one and two in capturing the behavior of a typical quadrupole dispersion curve in the wavenumber and slowness domains respectively.
Figure 2B:
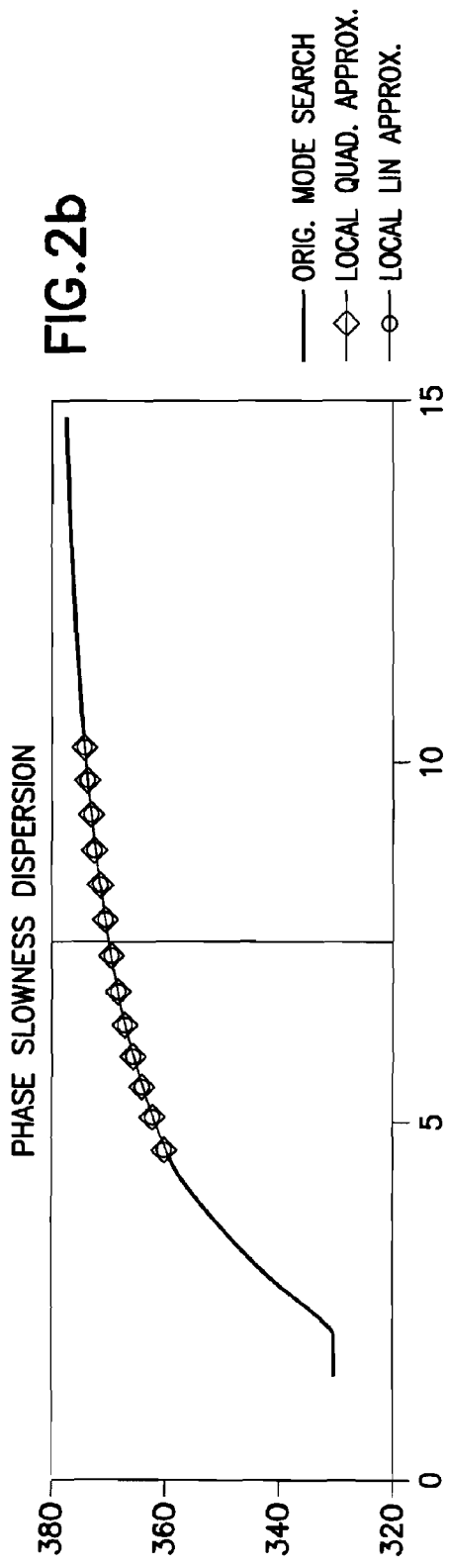

In a more general way, it is possible to rewrite the above expression as a function of the sensor number, which yields:

$$S_l(a,b) = \int_{-\infty}^{+\infty} \tilde{g}^*(af) \tilde{s}_j(f) e^{2i\pi f\left[b - \frac{\delta_{l,j} k(f)}{f}\right]} e^{-\delta_{l,j} A(f)} df, l > j \qquad (32)$$

where $\delta_{l,j}$ now denotes the spacing between the $l^{th}$ and $j^{th}$ sensors. This equation gives the relationship between the signal l and j in the wavelet domain. The objective is now to extract the wavenumber and the attenuation in order to be able to derive the group and phase velocity. There are two approaches to extract these parameters from equation (32). The first approach explicitly inverts the equation using a non-linear optimization approach, while the second approach, followed here, involves taking a local linear expansion of the wavenumber and attenuation and solving the problem with the resulting simpler model. In particular, a local Taylor expansion of the parameters k (f) and A(f) is developed. Numerical studies indicate that a first or second order local expansion of the wavenumber dispersion is sufficient to capture the local variation; physical considerations support this by imposing smoothness on the dispersion curves. FIGS. 2a and 2b illustrate the results of approximating a typical dispersion curve (quadrupole) with first and second order Taylor expansions. The local fit obtained thereby is adequate for capturing the local behavior of the dispersion curve. Moreover, since the approximation used in equation (33) below needs to be valid only over the spectral support of the scaled wavelet $\tilde{g}(af)$ and since this interval is smaller at the scales corresponding to low frequencies where the sharpest slowness variation typically occurs, it usually suffices to use the linear (first order) Taylor expansion for the wavenumber dispersion.

Linear Approach

It is possible to express the local linear Taylor expansion of $k(f)$ and $A(f)$ as $$k(f) = k(f_a) + (f - f_a)k'(f_a) + O(|f - f_a|) \qquad (33)$$

and $$A(f) = A(f_a) + O(|f - f_a|) \qquad (34)$$

with $$f_a = \frac{\omega_0}{2\pi a} \qquad (35)$$

where a is the scale considered (i.e. the frequency) and $\omega_0$ the central frequency of the mother wavelet.

Substituting the expressions (33) and (34) in (32) for the case of the local linear (order one) expansion yields:

$$S_l(a,b) = e^{-\delta_{l,j} A(f_a)} e^{-i2\pi\delta_{l,j}[k(f_a) - f_a k'(f_a)]} S_j(a, b - \delta_{l,j} k'(f_a)). \qquad (36)$$

Observing that $$[k(f_a) - f_a k'(f_a)] = f_a \left[\frac{k(f_a)}{f_a} - k'(f_a)\right] \qquad (37)$$

$$= f_a [s_\phi(f_a) - s_g(f_a)] \square \frac{\varphi_a}{2\pi}$$

appears as a phase factor, $\phi_a$, that can be written in terms of the phase and group slowness; taking $j=l_0$, the reference sensor, and representing the distance to it of the $l^{th}$ sensor by $\delta_l$, and finally writing the time shift parameter b simply as time, t, in other words, considering the wavelet coefficients as waveforms in time, it is possible to rewrite equation (36) as $$S_l(a,t) = e^{-\delta_l A(f_a)} e^{-i\delta_l \phi_a} S_{l_0}(a, t - \delta_l s_g) \qquad (38)$$

Equation (38) shows the relationship between the wavelet transform coefficients at each scale a of a pair of signals (i.e. l and $l_0$) using the linear Taylor development of the wavenumber dispersion. In that case it will be recognized that the CWT coefficients at the $l^{th}$ sensor are time shifted with respect to those at the $l_0^{th}$ sensor by an amount given by the group slowness and inter-sensor distance, and multiplied by a factor whose magnitude is dependent on the attenuation and whose phase depends on the difference of the phase and group slowness. Therefore, given the coefficients at a particular scale, a, corresponding to the frequency, $f_a$, there are three quantities to estimate, namely, the attenuation factor, the phase factor and the time shift given by the group slowness.

Method-1: Extracting the Group Slowness from the Modulus Maxima of the Wavelet Transform Group slowness represents the velocity with which the wave's envelope (shape of the amplitude) and energy propagates through space. In the case of a dispersive or attenuating medium this group velocity becomes dispersive, i.e., a function of the frequency. As already described, the transformation conserves the energy of the signal and therefore it is possible to obtain an estimate of the group velocity as a function of frequency directly in the wavelet domain. It will now be demonstrated how it is possible to extract the group velocity of a signal using the local modulus maxima of the wavelet transform.

In general, a wave propagating in a plane can be specified by the wavelength $\lambda$ and the angle $\Theta$ between the $x_1$ axis and the propagation direction. Hence, it is possible to obtain the apparent wavelength in the $x_1$ and $x_2$ direction respectively, by $$\lambda_1 = \frac{\lambda}{\cos\Theta} \text{ and } \lambda_2 = \frac{\lambda}{\sin\Theta}$$

Figure 3:
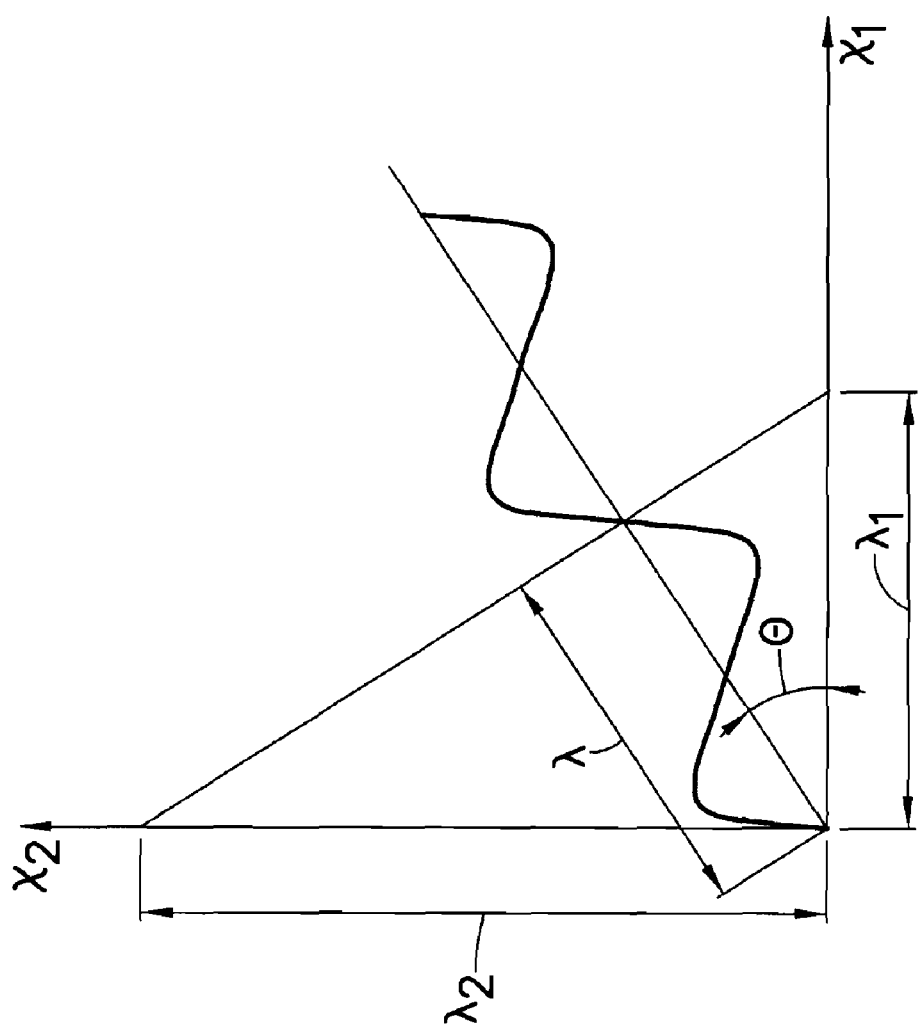
FIG. 3 illustrates an example of propagation in a plane.

(See FIG. 3). The superposition of two waves traveling in a plane with the same unit amplitude and with frequencies $\omega_1$ and $\omega_2$, respectively, is given by $$u(x_1, x_2, t) = e^{i(\omega_1 t - k_{11} x_1 - k_{12} x_2)} + e^{i(\omega_2 t - k_{21} x_1 - k_{22} x_2)} \quad (39)$$

where $k_{ij}$ are wavenumbers corresponding to the frequency $\omega_j$ and to the coordinate $x_i$ with the wavenumbers defined as $$k = \frac{2\pi}{\lambda}.$$

Applying this definition to waves traveling in the same direction leads to the wavenumbers $k_{j1} = k_j \cos\Theta$ and $k_{j2} = k_j \sin\Theta$. Therefore the wave equation can be expressed as $$u(x_1, x_2, t) = e^{i(\omega_1 t - k_1 \cos\Theta x_1 - k_1 \sin\Theta x_2)} + e^{i(\omega_2 t - k_2 \cos\Theta x_1 - k_2 \sin\Theta x_2)} \quad (40)$$

Defining $$k_c = \frac{k_1 + k_2}{2}, \omega_c = \frac{\omega_1 + \omega_2}{2}, \Delta k = \frac{k_1 - k_2}{2}, \text{ and } \Delta\omega_c = \frac{\omega_1 - \omega_2}{2},$$

the wave packet becomes $$u(x_1, x_2, t) = 2 \cos(\Delta\omega_t - \Delta k \cos\Theta x_1 - \Delta k \sin\Theta x_2) e^{i(\omega_c t - k_c \cos\Theta x_1 - k_c \sin\Theta x_2)} \quad (41)$$

Fourier and wavelet transform of $u(x_1, x_2, t)$ yields:

$$U(x_1, x_2, a, b) = \sqrt{a} [e^{i(\omega_1 b - k_1 \cos\Theta x_1 - k_1 \sin\Theta x_2)} \hat{g}(a\omega_1) + e^{i(\omega_2 b - k_2 \cos\Theta x_1 - k_2 \sin\Theta x_2)} \hat{g}*(a\omega_1)] \quad (42)$$

After manipulation, the result is:

$$|U(x_1, x_2, a, b)| = \sqrt{a} \left[ \begin{array}{c} \hat{g}(a\omega_1)^2 + \hat{g}(a\omega_2)^2 + 2\hat{g}(a\omega_1) \\ \hat{g}(a\omega_2)\cos(2\Delta\omega_b - 2\Delta k \cos\Theta x_1 - 2\Delta k \sin\Theta x_2) \end{array} \right]^{\frac{1}{2}} \quad (43)$$

If k is small, then $k_1 \approx k_2$, $\omega_1 \approx \omega_2$ and $\hat{g}(a\omega_1) \approx \hat{g}(a\omega_2) \approx \hat{g}(a\omega_c)$, then (43) becomes $$|U(x_1, x_2, a, b)| \approx \quad (44)$$

$$\sqrt{2a} |\hat{g}(a\omega_c)| [1 + 2\cos(2\Delta\omega_b - 2\Delta k \cos\Theta x_1 - 2\Delta k \sin\Theta x_2)]^{\frac{1}{2}}.$$

If $$2\Delta\omega_b - 2\Delta k \cos\Theta x_1 - 2\Delta k \sin\Theta x_2 = 0 \quad (45)$$

and $$a = \frac{\omega_0}{\omega_c} \quad (46)$$

the magnitude of the wavelet transform takes its maximum value. This is the case for $$b = \frac{\Delta k}{\Delta\omega}(\cos\Theta x_1 + \sin\Theta x_2) = \frac{1}{c}(\cos\Theta x_1 + \sin\Theta x_2). \quad (47)$$

This means that the location of the maximum peak of the magnitude of the wavelet transform at scale a provides the arrival time of the propagating wave with a group velocity c at the corresponding frequency. Therefore the maxima line of the wavelet transform will give the arrival time of the component of interest as a function of the frequency, which will provide in a straightforward manner the group velocity averaged over the source to sensor distance. In order to extract the group slowness across the array of sensors, it is possible to fit a line in the least squares sense to the arrival times at the sensors for each scale and use the slope of the fitted line to obtain the group slowness estimate at the corresponding center frequency, $f_a$. The peak locations can be corrected via exponential quadratic interpolation across time. The exponential quadratic interpolation may be chosen since the envelope of the reproducing kernel is a quadratic exponential in 'b', (Grossmann, A. and Morlet, J., 1984, Decomposition of Hardy functions into square integrable wavelets of constant shape, SIAM—J. Math. Anal., 15, 723-736).

Figure 4:
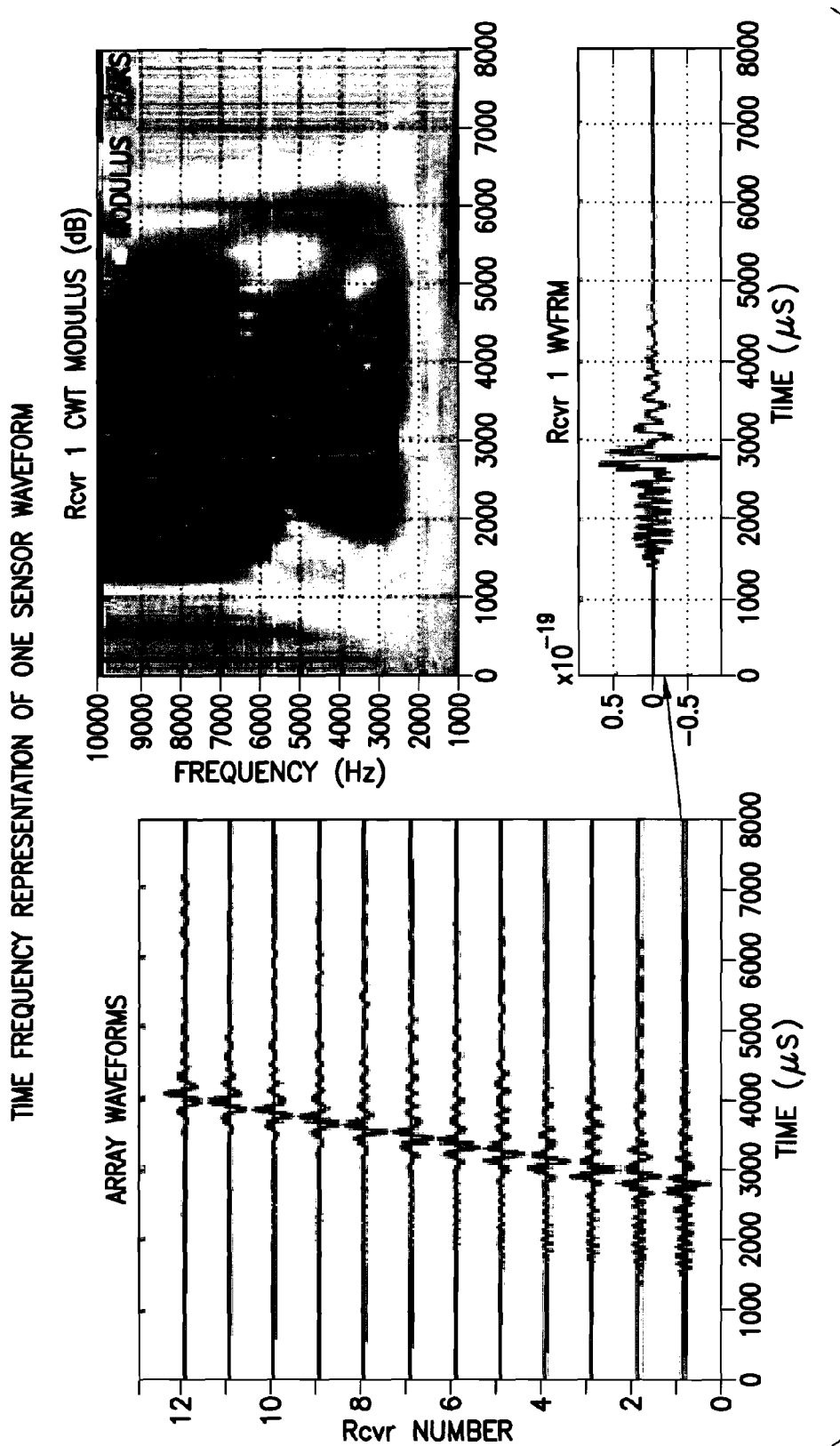
FIG. 4 illustrates a set of waveforms collected by an array of sensors and the transformation of one of the sensor waveforms into a 2-D time frequency map.
Figure 5:
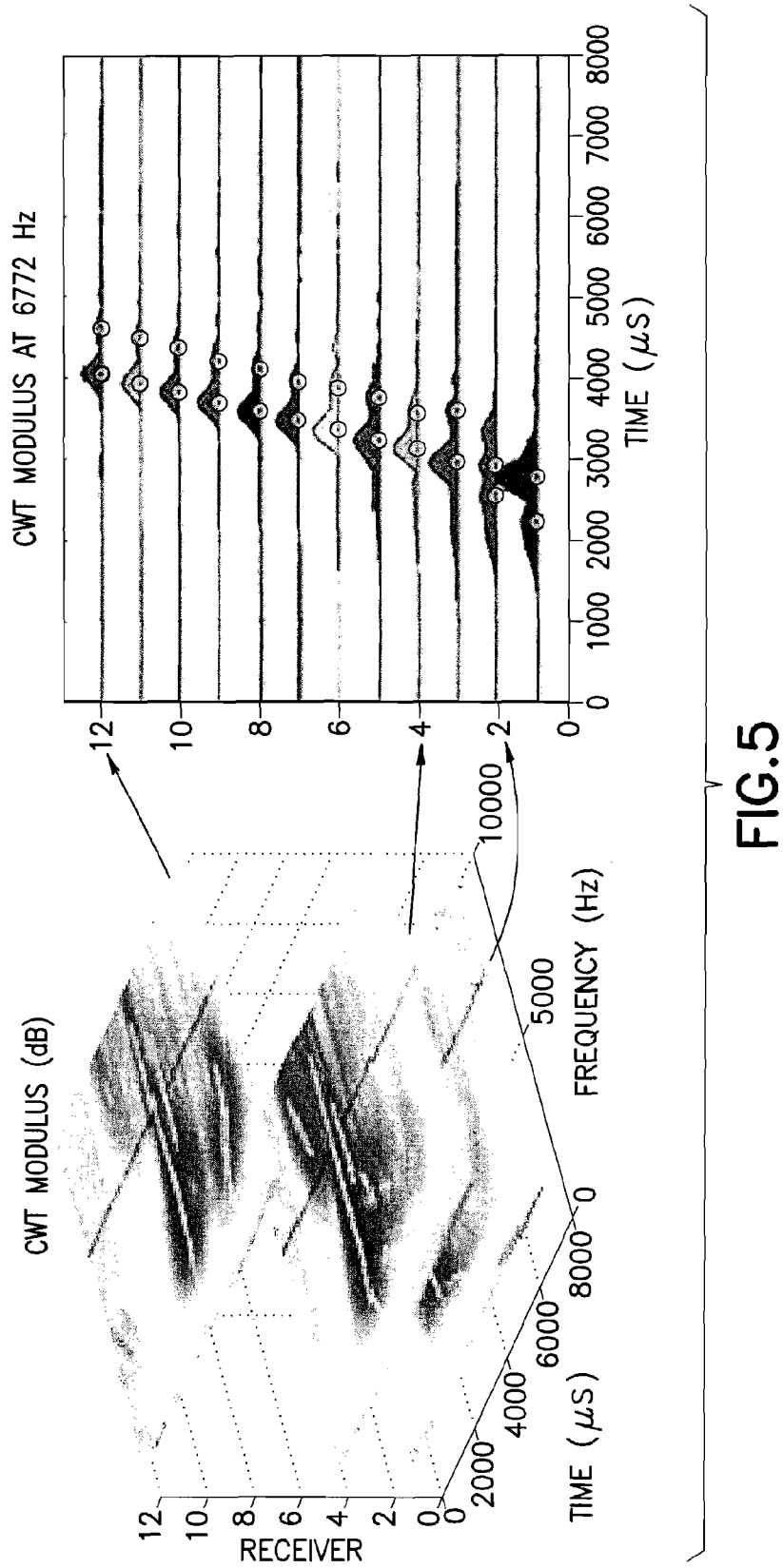
FIG. 5 illustrates the collection of 2-D maps obtained by the transformation from time domain to time-frequency domain of each waveform from the sensor array.
Figure 6:
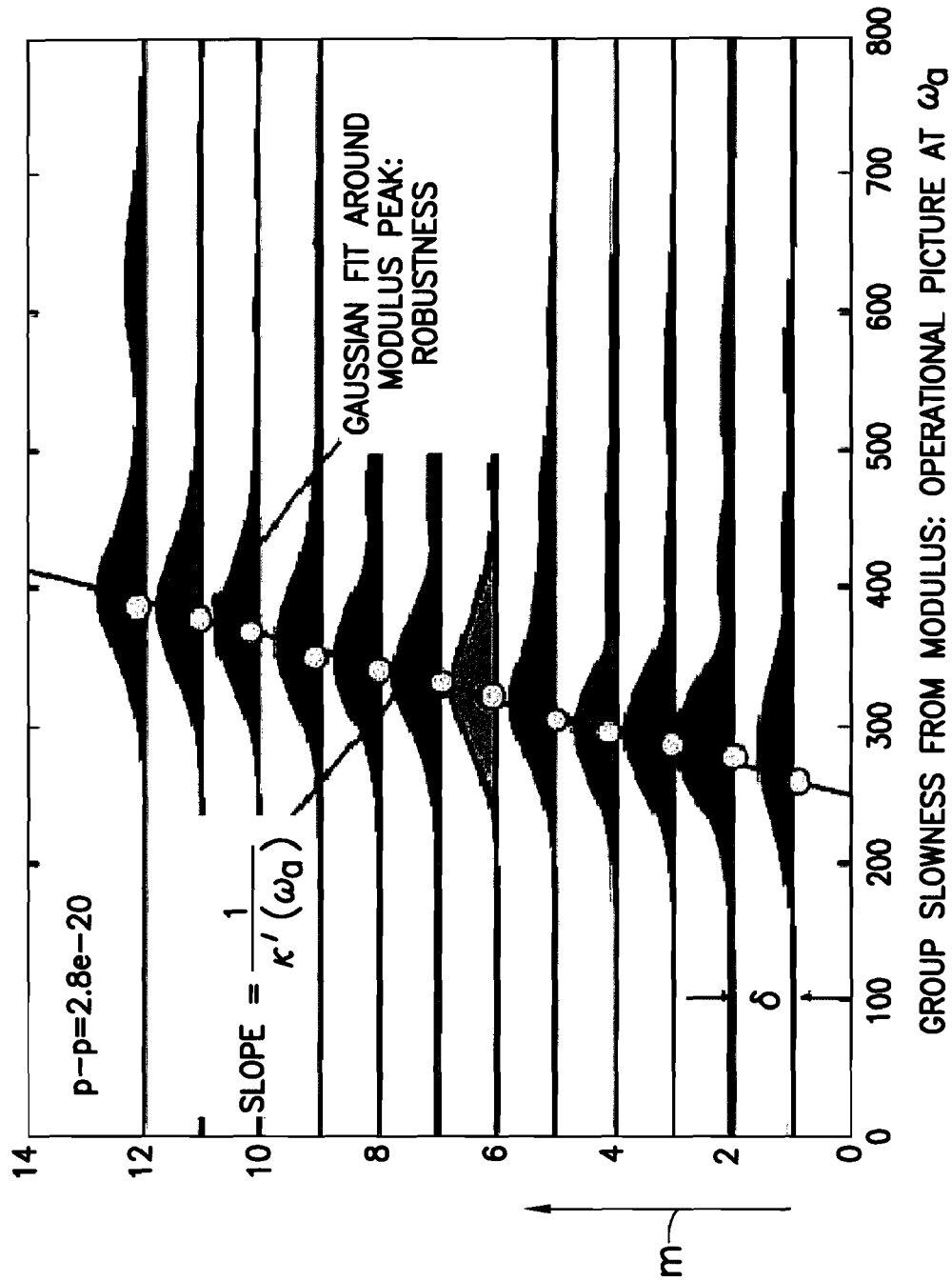
FIG. 6 illustrates the computation of group slowness at one scale (i.e., frequency).

FIGS. 4, 5 and 6 illustrate a methodology to extract the group slowness from the modulus of the wavelet transform of the recorded waveforms.

From Group Slowness to Phase Slowness and Attenuation

In order to obtain phase slowness from group slowness, a shift is first applied to the wavelet coefficients at each frequency, given by $(\delta_t s_g(f_a))$ as per equation (38), using the estimates of the group slowness obtained as described above. After the shift is applied, one approach for obtaining the phase factor, $\phi_a$, is to take the Fourier transform along the sensor axis on the shifted wavelet coefficients at the location of the intercept of the fitted line on the reference sensor or in a window around that location. The maximum of the FFT peak will correspond to the phase factor $\phi_a$. Using the relationship presented previously i.e. $\phi_a=2\pi f_a[s_{100}-s_g]$, it is possible to obtain the phase slowness.

The FFT operation can be viewed as a fast search to find the desired phase correction and is applicable for arrays with uniformly spaced sensors on a line, also called a uniform linear array or ULA. The attenuation too can be found by a similar search operation over possible values of the attenuation, but this can become computationally intensive. An alternative approach which simultaneously estimates the group and phase slowness is described below.

Assuming as above that the correct time shift is applied to the wavelet coefficients, $S_l(a,t)$, a rank one subspace model is obtained for the shifted coefficients:

$$\begin{bmatrix} S_1(a, t' + \delta_1 s_g) \\ S_2(a, t' + \delta_2 s_g) \\ \vdots \\ S_L(a, t' + \delta_M s_g) \end{bmatrix} = \begin{bmatrix} e^{-\delta_1(A(f_a)+i\varphi_a)} \\ e^{-\delta_2(A(f_a)+i\varphi_a)} \\ \vdots \\ e^{-\delta_L(A(f_a)+i\varphi_a)} \end{bmatrix} S_{l_0}(a, t') \quad (48)$$

where $l_0$ refers to the reference sensor and t' refers to a set of time indices in a window encompassing the mode of interest.

Note that this formulation corresponds to the complex exponential estimation problem. While, in general, this problem requires a non-linear inversion (or 2-D search), faster methods have been developed for the special but common case of the uniform linear array (ULA). For example, the matrix pencil method, such as in Ekstrom, M. P., 1995, Dispersion estimation from borehole acoustic arrays using a modified matrix pencil algorithm, *volume 2 of 29th Asilomar Conference on Signals, Systems and Computers,* pages 449-453, could be used to estimate the exponential parameter.

Alternatively, an even faster approach may be utilized which is easily applied to the ULA (and also to the case when the array can be subdivided into two sub-arrays with constant inter-sensor spacing between the corresponding elements of each), and which yields a closed form solution. However, it should be appreciated that it is not necessary to have a ULA for this method.

For purposes of this explanation, $\delta$ is defined as the common inter-sensor spacing between adjacent sensors, noting that $\delta_l=\delta(l-l_0)$, dropping the subscript on $\phi=2\pi f_a(s_\phi-s_g)$, and further defining $\alpha=A(f_a)$, and $Y_a$ as the LHS of equation (48), and rewrite that as:

$$Y_a = \begin{bmatrix} e^{-\delta(\alpha+i2\pi\varphi)(1-l_0)} \\ e^{-\delta(\alpha+i2\pi\varphi)(2-l_0)} \\ \vdots \\ e^{-\delta(\alpha+i2\pi\varphi)(L-l_0)} \end{bmatrix} S_{l_0}(a, t') + N \quad (49)$$

(considering the presence of noise, N).

Defining $$Y_{a,1} = \begin{bmatrix} Y_a(1) \\ Y_a(2) \\ \vdots \\ Y_a(L-1) \end{bmatrix}, Y_{a,2} = \begin{bmatrix} Y_a(2) \\ Y_a(3) \\ \vdots \\ Y_a(L) \end{bmatrix} \quad (50)$$

compute the quantities $$R_{ij} = \sum_o Y_{a,i}^* \Box Y_{a,j} \quad (51)$$

for i,j=1,2 where $(\cdot)^*$ denotes the complex conjugate, $\Box$ implies the element-by-element product of the matrices, $Y_{a,i}$ and $Y_{a,j}$ and $\Sigma_o$ indicates a sum taken over the elements of the product matrix so obtained. Note that $R_{12}$ and $R_{21}$ are complex conjugate and so only one of those needs to be computed in practice.

Provided that the noise is white Gaussian (which is reasonable if there is no coherent interference at the chosen moveout), the matrix built up from the above quantities satisfies $$\begin{bmatrix} R_{11} & R_{12} \\ R_{21} & R_{22} \end{bmatrix} = \sigma_1 V^H + \sigma_2 I_{2\times 2} \quad (52)$$

where $V=[1\ e^{-\delta(\alpha+i\phi)}]$, $I_{2\times 2}$ is the identity matrix of size 2 and $\sigma_1$ and $\sigma_2$ are two positive constants. Therefore, V is the right eigenvector corresponding to the larger (dominant) eigenvalue. Also, its components can be obtained in closed form for this case. Results for the estimates of $\alpha$ and $\phi$ can be expressed as:

$$\hat{\alpha} = -\log\left(\frac{\sqrt{(R_{11}-R_{22})^2 + 4\|R_{12}\|^2} - R_{11} + R_{22}}{2\|R_{12}\|}\right)\Big/\delta \quad (53)$$

$$\hat{\varphi} = -\angle(R_{12})/\delta$$

where $\angle(R_{12})$ denotes the complex phase of $R_{12}$.

Note that while the above process is designed to be applied to a ULA or an array that can be decomposed into two sub-arrays with constant separation, it is possible to use a similar process for a general array to estimate the attenuation and phase factors. In particular, the process is applied to the sensors in pairwise fashion, using the appropriate inter-sensor spacing $\delta$ for each pair and taking the average.

As already explained above, these estimates can now be used to generate estimates for the phase slowness and attenuation at the frequency corresponding to the scale a being processed. Repeating this for the other scales (frequencies) of interest yields the desired dispersion curve estimates.

Multiple Peaks Processing

As outlined above, in order to find the group slowness at each frequency, the shift in the peak at the particular frequency is determined, i.e., at a particular value of the scale a.

In the general set-up there can be more than one 'mode' that can be present. Thus, in general:

$$S_l(a, b) = \sum_{i=1}^{P} S_l^i(a, b) \quad (54)$$

Assuming that the time frequency separation of the modes is sufficient to allow the corresponding energy concentrations to occupy disjoint regions (or support sets) in the time-frequency plane across the arrays, the following approximation holds true:

$$|S_l(a, b)| \sim \sum_{i=1}^{P} \left| S_{l_0}^i(a, b - s_g^i(f_a)\delta_l) \right| \quad (55)$$

In particular, equation (55) indicates that it is possible to obtain the envelope peaks for each of the modes when the modes are sufficiently separated in the time frequency place, for accurate processing of group slowness for each mode, in presence of low noise.

Data Association

In order to associate peaks from one sensor to the next, it is assumed that the group slowness is not varying across the sensors. Since the modes are well separated in time and frequency (i.e., the peaks are well separated), the problem is formulated as a 2-D minimal matching problem from a current set of peaks to the next set of peaks. This can be accomplished as follows:

Fix a frequency, e.g., $f_a$. Let P be the number of peaks that are being tracked at frequency $f_a$. Consider a sensor l and denote the peak locations at sensor l by $Y_i$, i=1, 2, . . . , P. Denote the peak locations at sensor l+1 by $Y_j$, j=1, 2, . . . , P. Then, to solve the following minimization problem, $$\min_{e_{ij}} \Sigma_{i,j} c_{ij} e_{ij}$$

sub to: $e_{ij} \in 0, 1; \Sigma_i e_{i,j}=1; \Sigma_j e_{ij}=1$ (56)

where $e_{ij}=0$ denotes no association between $Y_i$ and $Y_j$ and $e_{ij}=1$ denotes that $Y_i$ is associated with $Y_j$. The cost $c_{ij}$ is proportional to the dissimilarity between $Y_i$ and $Y_j$ and can be captured via many metrics. It is also possible to incorporate 'prior' information in order to develop the cost structure. The above integer programming problem can be relaxed to a linear programming one via the following approach. Let A denote the vertex edge incidence matrix for the complete bipartite graph between vertex sets $Y_i$ and $Y_j$, i.e. $A_{ve}=1$ if vertex $v \in$ edge(e), otherwise $A_{ve}=0$. With the notation $1=[1, 1, \ldots, 1]^t$ and $e=[e_{11} e_{12}, \ldots, e_{ik}, \ldots]^t$, it is possible to write the above integer program as $$\min c'e$$

sub to: $Ae=1; e \geq 0$ (57)

where c is a $N^2 \times 1$ vector of costs on edge $e_{ij}$, $\forall i,j$. The theorem described below is useful for this purpose. (Steele, J. M., Probability theory and combinatorial optimization, SIAM).

Theorem

For the vertex edge incidence matrix A of a bipartite graph, the vertices of the polytope defined by $$Ae \leq 1; e \geq 0$$

consists of 0-1 vectors. Moreover these vectors are incidence vectors of matchings.

□

From the above theorem, it follows that the integer programming problem can be relaxed to a linear programming one by relaxing the hard constraints of equalities to inequalities. Then using the "SIMPLEX" method ($O(P^3)$ complexity) of linear programming it is possible to find the minimal cost matching.

In the method described herein it is assumed that the group slowness does not vary significantly across the sensor array, that it is bounded from above, and there is no negative group velocity. Based on these assumptions, the costs are chosen as $$c_{ij} = \begin{cases} Y_j - Y_i & \text{if } Y_j - Y_i > 0 \\ C_0 & \text{if } Y_j - Y_i < 0 \text{ or if } Y_j - Y_i > T_0 \end{cases} \quad (58)$$

where $C_0$ is a large number and $T_0$ is the limit on the time shift and can be derived from the sensor spacing and the sampling time and upper bound on the group slowness. Other choices of cost function are also possible and several lead to good results in practice.

Propagating the Association Across Sensors

Associating the peaks across the sensors, 1, . . . , L is an association problem over L sets $Y_1, \ldots, Y_L$ of peak locations. This is a L-dimensional data association problem which can be formulated as an integer program in a similar manner. However the complexity of such an algorithm is $o((P!)^L)$.

Suboptimal Approach

Since the complexity of association across the sensors is exponential, it may be preferable to employ a suboptimal approach for data association across the sensors. One example of a suboptimal algorithm is as follows.

Algorithm

1. Start from the last sensor as the modes have more chance to be separated in time at the last sensor. Let the peak locations be given by $Y_L$. Assume these to be the correct peaks.

2. Using 2-D minimal assignment, find the correct permutation, $\pi_{L-1}$, for the peak locations, $Y_{L-1}$, with respect to the peak locations, $Y_L$. Call the new permuted vector $Y_{L-1}(\pi_{L-1})$.

3. Using 2-D minimal assignment, find $\pi_{L-2}$ for peaks $Y_{L-2}$ with respect to $Y_{L-1}(\pi_{L-1})$.

4. Repeat steps 2 and 3 until the first sensor.

The above algorithm behaves like an inference propagation type algorithm where the inference from the previous association is propagated to the next. This approach is suboptimal because it is subject to propagation of errors. However, error propagation can be mitigated by using good cost structures, i.e., incorporating some prior information or if the number of peaks are small then using K dimensional matching and then propagating the associations.

Figure 7:
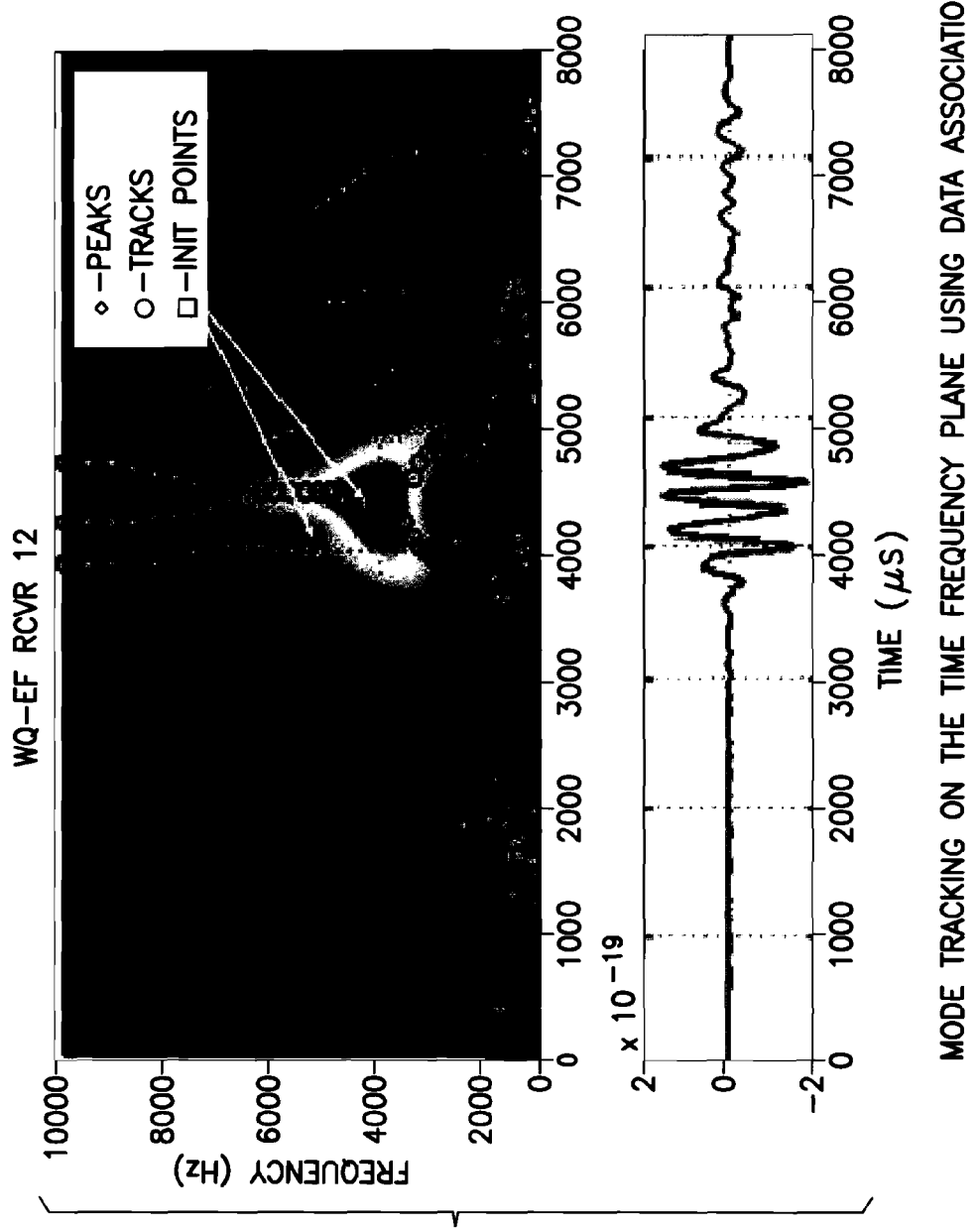
FIG. 7 illustrates the result of using data association to track and label modulus peaks for various modes on the time frequency plane for the reference sensor data.

The described data association process can also be applied to tracking peaks across frequency (or scale) on the time frequency plane. This is useful for labeling propagating modes when more than one are present, and using that to appropriately extract the dispersion curve for each. FIG. 7 illustrates an example of such a mode tracking on the time frequency plane using the data association described above.

Bias Correction

Estimates of the dispersion can be biased in some cases. The analysis for the method described below shows that a bias may exist particularly for the group slowness when the spectral mean frequency of the wavelet coefficients at any scale are different from the nominal center frequency and when the group slowness changes over the bandwidth of the said coefficients. A relatively simple technique to correct the resulting bias is to refer the dispersion estimates to the spectral mean frequency rather than to the nominal center frequency. The spectral mean is calculated as follows $$f_c = \frac{\int \sum_l |\tilde{S}_l(a,f)|^2 f \, df}{\int \sum_l |\tilde{S}_l(a,f)|^2 \, df} \tag{59}$$

where $\tilde{S}(a,f)$ is the Fourier transform of the wavelet coefficients calculated in a neighborhood of the mode of interest. This could also be obtained as the instantaneous frequency computed as a derivative of the phase of the complex coefficients at the modulus maxima. Note that when the coefficients from the reassigned scalogram are used, this frequency correction is already applied as a consequence of the reassignment as shown in equation (21) and no further bias correction is generally needed.

Figure 8:
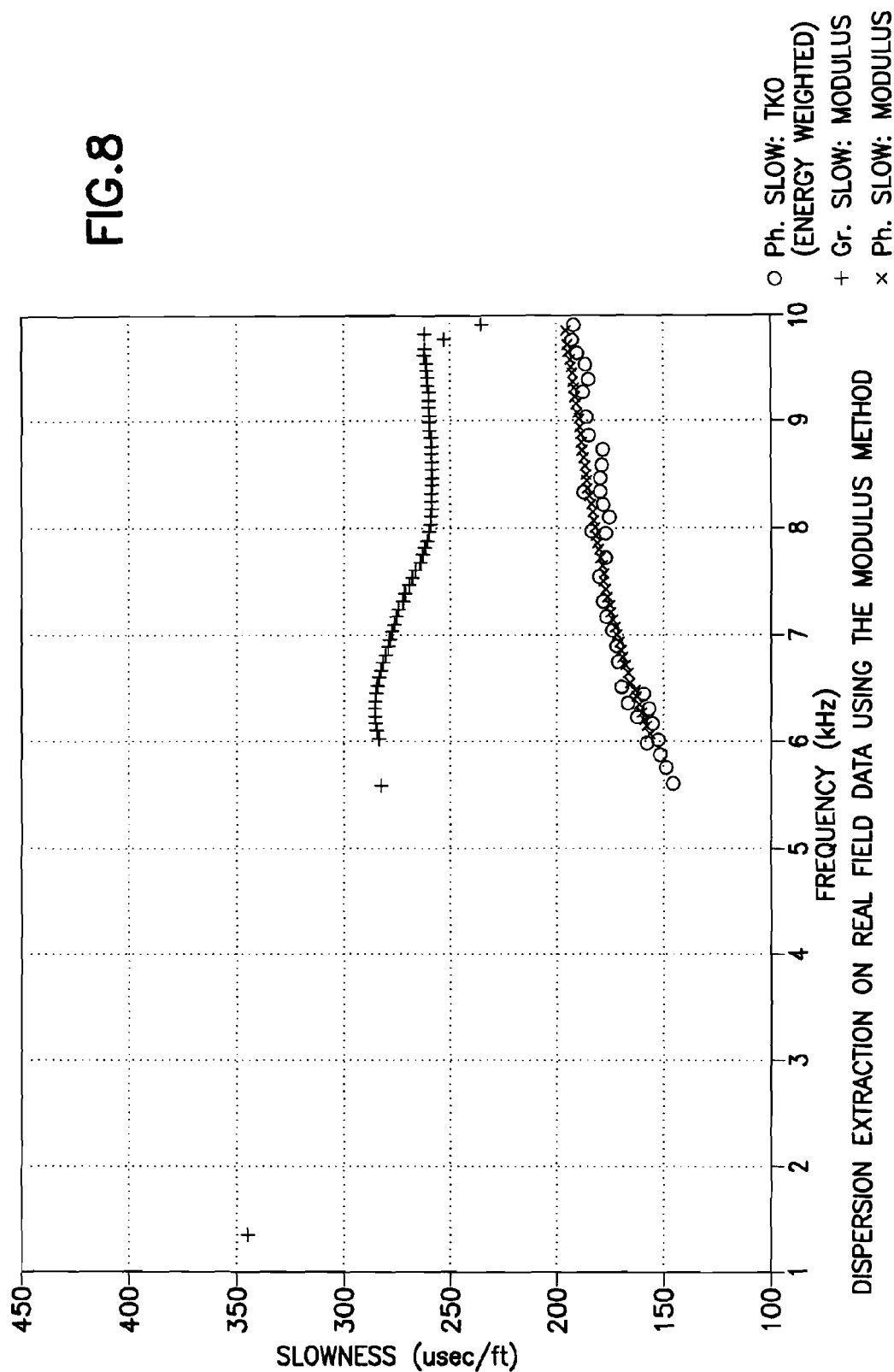
FIG. 8 illustrates comparison of the dispersion extraction method (method 1) on a frame of oilfield data recorded in a fluid filled borehole, where the circles correspond to the dispersion curve extracted from the Prony's method while the cross marks correspond to the dispersion curve computed from the algorithm presented in this study.

FIG. 8 illustrates an example of application of the proposed method to real oilfield data. In both cases, the proposed method is compared to the existing matrix pencil method. Note that the new method yields more stable and better estimates.

Method-2: The Exponential Projected Radon Transform (EPRT)

As indicated by equation (38), the three quantities to estimate are the attenuation factor, the phase factor and the time shift given by the group slowness. The last problem is similar to non-dispersive processing which has been well studied in the literature. A classic method is to use the Radon transform (Deans, S. R., 1983, The Radon Transform and Some of its Applications, A Wiley Interscience publication) or operators based thereon. The Radon transform is a way of representing an array of waveform traces acquired at a number of known spatial locations in terms of components propagating at different moveouts or slownesses. This can be used to separate non-dispersive components propagating at different slownesses and in addition can also be used to estimate these quantities. Thus, if $x_l(t)$ represents a set of waveform traces obtained with an array of sensors and consisting of non-dispersive components satisfying the relation $$y_l^i(t) = y_{l_o}^i(t - s_i \delta_l) \tag{60}$$

where $y^i$ is the $i^{th}$ non-dispersive component of x propagating at the slowness $s_i$ and the Radon transform takes the form of a slant stack:

$$R(p, t) = \sum_{l=1}^{L} x_l(t + p\delta_l) \tag{61}$$

where p is the test moveout or slowness.

Associated with this, it is possible to compute a semblance, which is calculated by taking the ratio of the Radon transform output to the total energy. In practice, in order to account for the presence of more than one component in the input data and to improve the noise performance, this ratio is taken after integrating both the slant stack energy (which captures the energy of the coherent component at the corresponding moveout) and the input energy over a set of time windows chosen to capture the individual components and indexed by the starting time $$\rho(t, p) = \frac{\int_t^{t+T_w} \left| \sum_{l=1}^{L} x_l(t + p\delta_l) \right|^2 dt}{L \int_t^{t+T_w} \sum_{l=1}^{L} |x_l(t + p\delta_l)|^2 dt} \tag{62}$$

The semblance can therefore be interpreted as the ratio of the coherent energy divided by the total energy in a time window $T_w$ at time t and measures the degree of similarity of the received waveforms in the windows corresponding to the test moveout across the array and hence the name. When there is a perfect match of the test moveout p with the slowness $s_i$ of a component, the result is a value close to 1 which is the maximum possible. In other words, the peaks of $\rho$ in the (t, p) plane yield the slowness and time locations of compact non-dispersive propagating components. This forms the basis of the slowness-time-coherence processing (Kimball, C. V. and Marzetta, T., Semblance Processing of borehole acoustic array data, Geophysics, 49(3):264-281, March 1984) applied to non-dispersive waves in the oilfield business.

The Exponential Projected Radon Transform (EPRT)

Although estimating phase and attenuation factors in addition to the simple time shift of the non-dispersive processing above is more complex, it is possible to address the issue of estimating these additional parameters by noting that the Radon transform and semblance described above perform the operation of projecting onto a subspace after performing a test moveout correction by time-shifting the waveforms. In that case, the subspace is a special one comprising a vector of '1's. When the test moveout matches the true slowness, then the projection on this subspace leads to a maximum of the chosen criterion, either energy or semblance.

Equation (38) presents an analogous situation. Assuming that it is possible to apply the correct timeshift corresponding to the group slowness, $s_g$, to the wavelet coefficients, $S_l(a, t)$, then a rank one subspace model for the shifted coefficients can be obtained as shown previously in equation (48). Referring to that equation, by analogy it is desirable to project onto the subspace corresponding to the column vector containing the exponential terms on the RHS. However, the attenuation and phase parameters comprising the latter are unknown and it is first necessary to estimate them. An approach to do so, given a time shift, has already been described under method 1 with the desired estimates being given by equation (53).

Having thus obtained these exponential parameter estimates, it is now possible to perform the desired subspace projection as described above. Further, making the ULA assumption, it is possible to describe the estimated subspace (from equation 48) as:

$$U = \begin{bmatrix} e^{-(\hat{\alpha}+i\hat{\varphi})\delta(1-l_0)} \\ e^{-(\hat{\alpha}+i\hat{\varphi})\delta(2-l_0)} \\ \vdots \\ e^{-(\hat{\alpha}+i\hat{\varphi})\delta(L-l_0)} \end{bmatrix} \tag{63}$$

The projection operator on this subspace is give by:

$$P_U = \frac{1}{\sqrt{U^H U}} U^H \tag{64}$$

$$= \frac{1}{\sqrt{\sum_l e^{-2\hat{\alpha}\delta(l-l_0)}}} U^H$$

$$= \left( e^{-\hat{\alpha}\delta(2l_0+1-L)} \frac{\sinh(\hat{\alpha}\delta)}{\sinh(L\hat{\alpha}\delta)} \right)^{1/2} U^H$$

where $(\square)^H$ denotes the Hermitian or complex conjugate transpose.

Figure 9:
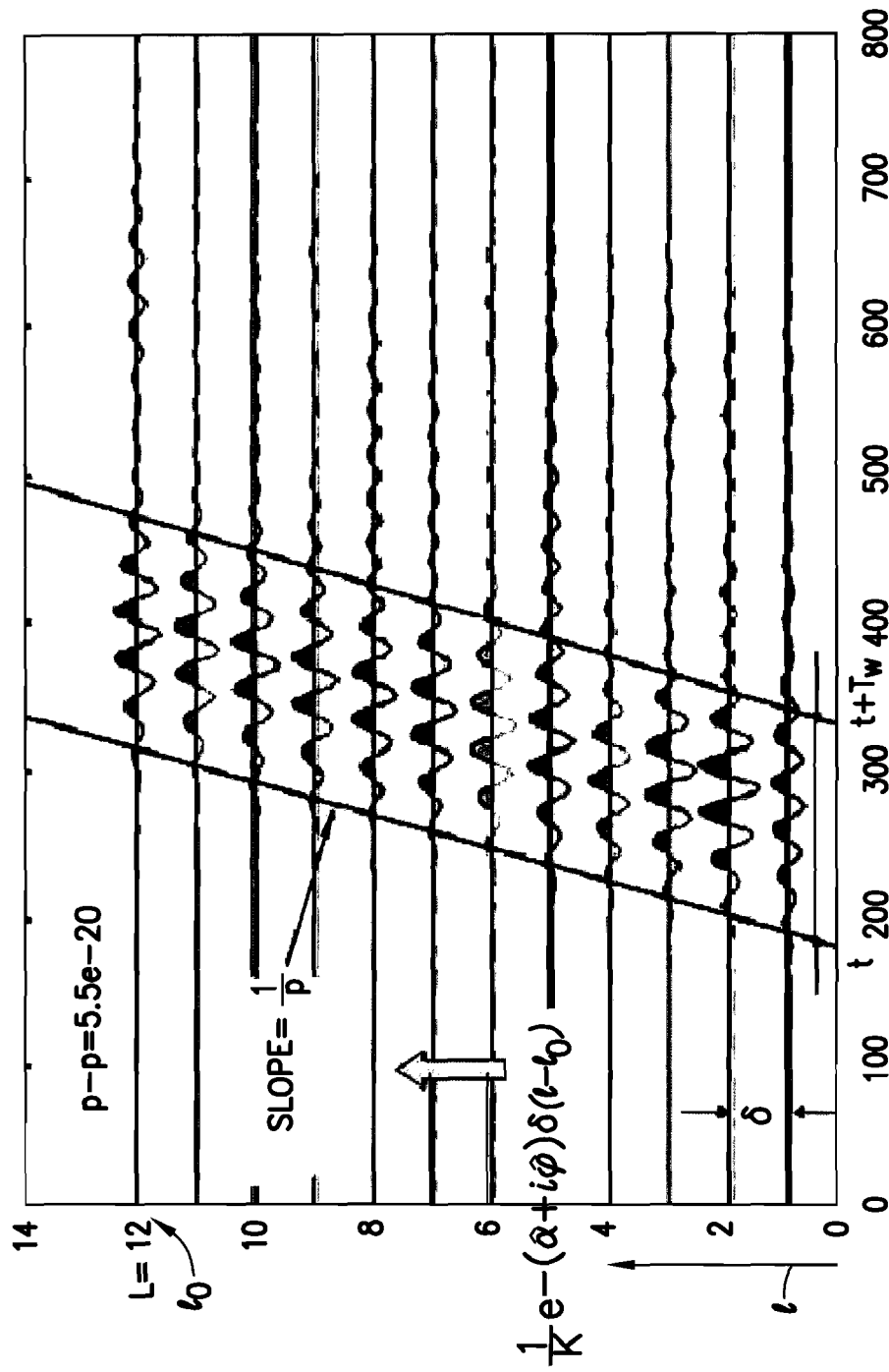

Applying this projection on the wavelet coefficients computed on the array data at a particular scale a for a set of time and moveouts yields the analogous form for the modified Radon transform $$R_a(t, p; \hat{\alpha}, \hat{\varphi}) = e^{-\hat{\alpha}(2l_0+1-L)} \frac{\sinh(\hat{\alpha}\delta)}{\sinh(L\hat{\alpha}\delta)} \tag{65}$$

$$\int_t^{t+T_w} \left| \sum_{l=1}^{L} e^{-(\hat{\alpha}-i\hat{\varphi})\delta(l-l_0)} S_l(a, t+p(l-l_0)\delta) \right|^2 dt$$

where the energy is considered and therefore the projected quantities are squared and this energy is integrated in a window positioned according to the parameter t. The quantities $\hat{\alpha}$ and $\hat{\varphi}$ are now estimated for each t and p and therefore functions of the latter. This operation is illustrated in FIG. 9.

As before, it is possible to compute a corresponding semblance quantity for each scale $$\rho_a(t, p; \hat{\alpha}, \hat{\varphi}) = e^{-\hat{\alpha}(2l_0+1-L)} \frac{\sinh(\hat{\alpha}\delta)}{\sinh(L\hat{\alpha}\delta)} \tag{66}$$

$$\frac{\int_t^{t+T_w} \left| \sum_{l=1}^{L} e^{-(\hat{\alpha}-i\hat{\varphi})\delta(l-l_0)} S_l(a, t+p(l-l_0)\delta) \right|^2 dt}{\int_t^{t+T_w} \sum_{l=1}^{L} |S_l(a, t+p(l-l_0)\delta)|^2 dt}$$

where when $\hat{\alpha}, \hat{\varphi}=0$, the expression is recovered for the non-dispersive case. It is thus possible to obtain maps on the (t, p) plane analogous to the Radon transform and semblance where each point on the map is computed using the corresponding estimated quantities $\hat{\alpha}$ and $\hat{\varphi}$ for the projection. These maps are referred to as the Exponential Projected Radon Transform (EPRT) and the EPRT semblance. As before, the peaks give information about the time localization and group slowness of the propagating components at the scale being analyzed while the corresponding estimated phase and attenuation factors can be used to extract the corresponding phase slowness and attenuation. These estimates can be further refined, if desired, by executing a local search in the vicinity of these estimates and the corresponding peak values of t and p to find the phase and attenuation factors that maximize the output energy and semblance respectively.

This extraction and possible refinements are discussed further in the next section where these outputs are analyzed.

The Analysis of EPRT

For the sake of simplicity it is assumed that there is only one mode present. Following the analysis in C. V. Kimbal and T. Marzetta Semblance Processing of borehole acoustic array data., Geophysics, 49(3):264-281, March 1984, assume that the time window length $T_w$ (note that this depends on the scale) and time position t at scale a is chosen in equation (66) so that it encloses the coefficient waveform of interest completely. Then using Parseval's relation it is possible to write $$\rho_a(p; \hat{\alpha}, \hat{\varphi}) = e^{-\hat{\alpha}(2l_0+1-L)} \frac{\sinh(\hat{\alpha}\delta)}{\sinh(L\hat{\alpha}\delta)} \tag{67}$$

$$\frac{\int \left| \sum_{l=1}^{L} S_l(a, f) e^{-(\hat{\alpha}-i(\hat{\varphi}+2\pi p f))\delta(l-l_0)} \right|^2 df}{\int \sum_{l=1}^{L} |S_l(a, f)|^2 df}$$

where $S_l(a, f)$ is the Fourier Transform of $S_l(a, t)$ and $\rho_a(p; \hat{\alpha}, \hat{\varphi})$ is the value of the semblance for a value of t, the time window position, so as to encompass the signal appropriately. As before, let k(f) be the actual (real) wavenumber as a function of the frequency for the dispersive wave and A(f) be the attenuation. Then it follows from the linearity of the wavelet transform that $$S_l(a, f) = X(a, f) e^{-(A(f)+i2\pi k(f))\delta(l-l_0)} \tag{68}$$

where $X(a, f)=X(f)G^*(af)$, G(f) is the Fourier transform of the analyzing mother wavelet and X(f) is the Fourier transform of the waveform component contained in the applied time window and received at the reference sensor. Inserting this expression into the semblance computed by the EPRT (equation 67) yields $$\rho_a(p; \hat{\alpha}, \hat{\varphi}) = \tag{69}$$

$$\frac{1}{K} \frac{\int \left| \sum_{l=1}^{L} X(a, f) e^{-(A(f)+i2\pi k(f))\delta(l-l_0)} e^{-(\hat{\alpha}-i(\hat{\varphi}+2\pi p f))\delta(l-l_0)} \right|^2 df}{\int \sum_{l=1}^{L} |X(a, f) e^{-(A(f)+i2\pi k(f))\delta(l-l_0)}|^2 df}$$

where the normalizing quantity K (function of $\hat{\alpha}$) is defined by $$\frac{1}{K} = e^{-\hat{\alpha}(2l_0+1-L)} \frac{\sinh(\hat{\alpha}\delta)}{\sinh(L\hat{\alpha}\delta)} \qquad (70)$$

Collecting attenuation and phase terms in equation (69) and simplifying yields $$\rho_a(p;\hat{\alpha},\hat{\varphi}) = \frac{1}{K} \frac{\int |X(a,f)|^2 \left|\sum_{l=1}^{L} e^{\{-(\hat{\alpha}+A(f))+i(\hat{\varphi}+2\pi(pf-k(f)))\}\delta(l-l_0)}\right|^2 df}{\int \|X(a,f)\|^2 \sum_{l=1}^{L} |e^{-A(f)\delta(l-l_0)}|^2 df} \qquad (71)$$

Denoting $$\Pi(f) = \sum_{l=1}^{L} |e^{-A(f)\delta(l-l_0)}|^2 = e^{-\delta A(f)(L-1-2l_0)} \frac{\sinh(L\delta A(f))}{\sinh(\delta A(f))} \qquad (72)$$

and $$\tilde{X}(a,f) = X(a,f)\sqrt{\Pi(f)} \qquad (73)$$

it is possible to define the frequency semblance $$\rho_a(f, p; \hat{\alpha}, \hat{\varphi}) = \frac{1}{K\Pi(f)} \left|\sum_{l=1}^{L} e^{\{-(\hat{\alpha}+A(f))+i(\hat{\varphi}+2\pi(pf-k(f)))\}\delta(l-l_0)}\right|^2 \qquad (74)$$

and write $$\rho_a(p; \hat{\alpha}, \hat{\varphi}) = \frac{\int |\tilde{X}(a,f)|^2 \rho_a(f, p; \hat{\alpha}, \hat{\varphi}) df}{\int |\tilde{X}(a,f)|^2 df} \qquad (75)$$

Further defining $$\gamma = -\frac{\delta}{2}(\hat{\alpha}+A(f)) \qquad (76)$$
$$v = \frac{\delta}{2}(\hat{\varphi}+2\pi(pf-k(f)))$$

yields $$\rho_a(f, p; \hat{\alpha}, \hat{\varphi}) = \frac{1}{K\Pi(f)} \left|\sum_{l=1}^{L} e^{2(\gamma+iv)(l-l_0)}\right|^2 \qquad (77)$$

After some algebra, this simplifies to $$\rho_a(f, p; \hat{\alpha}, \hat{\varphi}) = \frac{\sinh(\hat{\alpha}\delta)}{\sinh(L\hat{\alpha}\delta)} \frac{\sinh(A(f)\delta)}{\sinh(LA(f)\delta)} \left|\frac{\sinh(L(\gamma+iv))}{\sinh(\gamma+iv)}\right|^2 \qquad (78)$$

considering the hyperbolic sine function with complex arguments. Finally defining $$\Upsilon(\gamma) = \frac{\sinh(\hat{\alpha}\delta)}{\sinh(L\hat{\alpha}\delta)} \frac{\sinh(A(f)\delta)}{\sinh(LA(f)\delta)} \frac{\sinh^2(L\gamma)}{\sinh^2(\gamma)} \qquad (79)$$

$$\Lambda(\gamma) = \frac{1}{\sinh^2(\gamma)} - \frac{L^2}{\sinh^2(L\gamma)},$$

yields the second order Taylor expansion around v=0 of the frequency semblance as $$\rho_a(f, p; \hat{\alpha}, \hat{\varphi}) \approx \Upsilon(\gamma)\{1-\Lambda(\gamma)v^2\} \qquad (80)$$

where γ and v are defined in (76) and focus is directed to the region around v=0 for the analysis since that value maximizes the semblance and therefore, with good estimates of the phase factor, this is the region of interest. Note, however, that since $\hat{\alpha} \approx A(f)$ in the frequency band of the wavelet coefficients, the attenuation quantity γ is not close to 0 in general and so a similar Taylor expansion for γ is not made.

Now exploiting the spectral concentration of the wavelet coefficients $\tilde{X}(a, f)$ (defined as in (73)) around the center frequency $f_a$, expand the wavenumber, k(f), and attenuation, A(f), around $f_a$ using the Taylor series expansion as was done in equation (33). However, for the analysis, retain an extra term in each case, i.e. take the Taylor expansion up to the second order term for k(f) and the linear term for A(f)

$$k(f) = k(f_a) + k'(f_a)(f-f_a) + \frac{k''(f_a)}{2}(f-f_a)^2 + o(|f-f_a|^2) \qquad (81)$$

$$\approx s_\phi f_a + s_g(f-f_a) + \frac{s_g^i}{2}(f-f_a)^2$$

$$A(f) = A(f_a) + A'(f_a)(f-f_a)$$

$$\approx A_0 + A_1(f-f_a)$$

where the quantities $s_\phi$ etc. above are understood to be the values at $f_a$ of each of the corresponding frequency dependent quantities and (·)' denotes the derivative with respect to f. Using these expansions, it is possible to express v from equation (76) as $$v \approx \frac{\delta}{2}\left(\hat{\varphi} + 2\pi\left(pf - s_\phi f_a - s_g(f-f_a) - \frac{s_g^i}{2}(f-f_a)^2\right)\right) \qquad (82)$$

$$= v_0 + v_1 \tilde{f} + v_2 \tilde{f}^2$$

where $\tilde{f}=f-f_a$ is defined as the natural frequency argument around the band center $f_a$ and the coefficients $v_0$, $v_1$ and $v_2$ are defined as $$v_0 = \frac{\delta}{2}(\tilde{\varphi} + 2\pi f_a(p - s_\phi)), \qquad (83)$$
$$v_1 = \delta\pi(p - s_g),$$
$$v_2 = -\frac{\delta\pi}{2}s_g^i$$

It is similarly possible to express $\gamma$ as $$\gamma \approx -\frac{\delta}{2}(\tilde{\alpha} + A_0 + A_1(f - f_a)) \qquad (84)$$
$$= \gamma_0 + \gamma_\varepsilon + \gamma_1 \breve{f}$$

with $$\gamma_0 = -\delta A_0, \qquad (85)$$
$$\gamma_\varepsilon = -\frac{\delta}{2}(\tilde{\alpha} - A_0),$$
$$\gamma_1 = -\frac{\delta}{2}A_1$$

taking into account that $\gamma_0$ is the value of $\gamma$ for the correct estimate of attenuation and $\gamma_\varepsilon$ is the perturbation due to the error in the estimate.

With the above approximations, the quantities in equation (79) can be expressed as $$\Lambda(\gamma) \approx \Lambda(\gamma_0) = \frac{1}{\sinh^2(\gamma_0)} \frac{L^2}{\sinh^2(L\gamma_0)} \qquad (86)$$
$$\Upsilon(\gamma) \approx 1 - \Lambda(\gamma_0)(\gamma_\varepsilon - \gamma_1 \breve{f})^2$$

where the terms due to the perturbations, $\gamma_\varepsilon$ and $\gamma_1 \breve{f}$, in $\Lambda$ are not included since it is assumed that these are small and the latter is already multiplied by similarly small terms in v. Those terms are therefore dropped since it is desired to capture the first order effects of the perturbations. Putting this back into the expression (80) for the frequency semblance yields $$\rho_a(f, p; \overline{\alpha}, \overline{\varphi}) \approx 1 - \Lambda(\gamma_0)(\gamma_\varepsilon - \gamma_1 \breve{f})^2 - \Lambda(\gamma_0)(v_0 + v_1 \breve{f} + v_2 \breve{f}^2)^2 \qquad (87)$$

The overall semblance can now be computed as in equation (75) by taking the spectrally weighted average over frequency. However the dependence of the semblance on the test parameter, p, and the estimated parameters, $\overline{\alpha}$ and $\overline{\varphi}$, is captured to first order by the two complement terms above, the first dependent on $\overline{\alpha}$ (actually since a good estimate of attenuation requires an appropriate value of p, there is an implicit dependence on the latter as well), and the second dependent on p and $\overline{\varphi}$. It is therefore possible to write $$\rho_a(p; \overline{\alpha}, \overline{\varphi}) \approx 1 - \rho_{a,1}^c(\overline{\alpha}) - \rho_{a,2}^c(p, \overline{\varphi}) \qquad (88)$$
with -continued $$\rho_{a,1}^c(\overline{\alpha}) = \Lambda(\gamma_0) \frac{\int |\tilde{X}(a,f)|^2 (\gamma_\varepsilon - \gamma_1 \breve{f})^2 df}{\int |\tilde{X}(a,f)|^2 df} \qquad (89)$$

$$\rho_{a,2}^c(p; \overline{\varphi}) = \Lambda(\gamma_0) \frac{\int |\tilde{X}(a,f)|^2 (v_0 + v_1 \breve{f} + v_2 \breve{f}^2)^2 df}{\int |\tilde{X}(a,f)|^2 df}$$

where $\breve{f} = f - f_a$ and $\tilde{X}(a, f)$ incorporates the attenuation normalization $\Pi(\gamma)$ as in equation (73).

In order to complete this computation, the spectral moments are defined as follows:

$$f_\delta = \frac{\int |\tilde{X}(a,f)|^2 \breve{f} df}{\int |\tilde{X}(a,f)|^2 df} \qquad (90)$$

$$\Delta_f^2 = \frac{\int |\tilde{X}(a,f)|^2 (\breve{f} - f_\delta)^2 df}{\int |\tilde{X}(a,f)|^2 df}$$

$$= \frac{\int |\tilde{X}(a,f)|^2 (f - f_a)^2 df}{\int |\tilde{X}(a,f)|^2 df} - (f_\delta)^2$$

$$\Gamma_f^3 = \frac{\int |\tilde{X}(a,f)|^2 (\breve{f} - f_\delta)^3 df}{\int |\tilde{X}(a,f)|^2 df}$$

$$= \frac{\int |\tilde{X}(a,f)|^2 (f - f_a)^3 df}{\int |\tilde{X}(a,f)|^2 df} - 3f_\delta \Delta_f^2 - (f_\delta)^3,$$

representing respectively, the difference between the spectrally weighted mean frequency and the center frequency $f_a$, the spectrum spread (variance) around the spectral mean frequency, and the 'skew' of the spectrum around the mean frequency. It is then possible to obtain the semblance complement quantities of equation in terms of the above $$\rho_{a,1}^c(\overline{\alpha}) = \Lambda(\gamma_0)[(\gamma_\varepsilon - \gamma_1 f_\delta)^2 + \gamma_1 \Delta_f^2] \qquad (91)$$

$$\rho_{a,2}^c(p; \overline{\varphi}) = \Lambda(\gamma_0)\left\{[v_0 + v_1 f_\delta + v_2(f_\delta^2 + \Delta_f^2)]^2 + \frac{1}{\Delta_f^2}[v_1 \Delta_f^2 + v_2(\Gamma_f^3 + 2f_\delta \Delta_f^2)]^2 + v_2^2(\ldots)\right\}$$

where the quantity ( . . . ) is independent of the estimated parameters and so is not described here in any greater detail.

These semblance complements are minimized when the squared quantities are zero. Therefore, setting those to zero and substituting the definitions of the coefficients from equations (83) and (85) yields the following expressions for the estimates that maximize the semblance:

$$\hat{\alpha} = A(f_a) + A'(f_a)f_\delta \qquad (92)$$

$$\hat{p} = s_g(f_a) + s'_g\left(f_\delta + \frac{\Gamma_f^3}{2\Delta_f^2}\right)$$

$$\hat{\varphi} = 2\pi\delta\left\{s_\phi(f_a)f_a - \hat{p}f_a + \frac{s'_g}{2}\left(\Delta_f^2 - f_\delta^2 - \frac{\Gamma_f^3 f_\delta}{\Delta_f^2}\right)\right\}$$

Those skilled in the art will recognize that the proposed approach does not estimate the parameters $\bar{\alpha}$ and $\bar{\varphi}$ by explicitly maximizing the semblance as shown above; rather they were computed for each choice of p (and window position t) using equation (53). However, it is possible to assume and even verify numerically that the computed values corresponding to $\hat{p}$ are close to those satisfying the equations in (92) above. Moreover, it is possible to refine these computed estimates via local searches to satisfy the maximizing equations above. Therefore, it is possible to use these expressions to declare the estimates for the attenuation and the group and phase slowness. First consider the case where the approximations of equations (33) and (34) hold good, i.e., when the terms from the next order of the Taylor expansion (second order for the wavenumber, first order for the attenuation) are relatively negligible over the spectral support of the coefficients $$s_g'\Delta_f \square s_g, s_\phi, A'(f_a)\Delta_f \square A(f_a) \qquad (93)$$

with the further understanding that $$f_\delta, \frac{\Gamma_f^3}{\Delta_f^2} < \Delta_f < f_0.$$

Substituting these approximations leads to the estimates $$\hat{A}(f_a) \leftarrow \hat{\alpha} \approx A_0 \qquad (94)$$

$$\hat{s}_g \leftarrow \hat{p} \approx s_g$$

$$\hat{s}_\phi \leftarrow \hat{p} + \frac{\hat{\varphi}}{2\pi f_a\delta} = s_\phi(f_a) + \frac{s'_g}{2f_a}\left(\Delta_f^2 - f_\delta^2 - \frac{\Gamma_f^3 f_\delta}{\Delta_f^2}\right) \approx s_\phi(f_a)$$

Note that these approximations hold good even when the conditions in (93) are not satisfied so long as the odd moments are negligible compared to the bandwidth, i.e., $$f_\delta, \frac{\Gamma_f^3}{\Delta_f^2} \square \Delta_f.$$

That holds when the spectrum represented by $\tilde{X}(a, f)$ is well centered on $f_a$. This is the case when the spectrum of the mode of interest is relatively flat over the effective support of the analyzing wavelet at scale a.

Bias Correction

When neither of the conditions stated above hold good, i.e., when the derivatives of the group slowness and the attenuation are not insignificant and when there is significant spectral asymmetry, then the estimates from equation (94) are biased. The resulting bias can be handled in at least two ways.

Frequency correction is motivated by the bias in both the attenuation and the group slowness estimates in (92) containing a linear term that is the linear Taylor expansion of the corresponding quantity evaluated at $f_a+f_\delta$. Assuming that this dominates the other terms, the bias can be handled by declaring the estimates in (94) to actually refer to the frequency $f_a+f_\delta$ instead of the center frequency, $f_a$. The phase slowness estimate, which shows smaller bias, can be appropriately corrected by estimating it as if the center frequency was $f_a+f_\delta$. This correction is logical since this is the effective center frequency for the frequency band of the processed coefficients. Note that $f_\delta$ can be readily calculated from the data. While simpler to implement, this can change the frequency support of the computed dispersion curve estimates, often shrinking it relative to the processing frequency band.

Slowness correction is another approach which explicitly estimates the bias terms in (92) and corrects for them. This process includes estimating the spectral moments $f_\delta$, $\Delta_f^2$ and $\Gamma_f$ as well as the derivatives of group slowness and attenuation. The former can be estimated from the data. The latter can be obtained once the group slowness and attenuation dispersion curves have been estimated. These are the biased dispersion curves and are liable to be noisy. However, by using smoothing operators to handle the noise and exploiting the condition that the bias in the derivatives is relatively small compared to the bias of the estimates themselves (due to smoothness of dispersion curves), a first order bias correction can be achieved. It is possible to further refine this estimate by another iteration if necessary.

Figure 10:
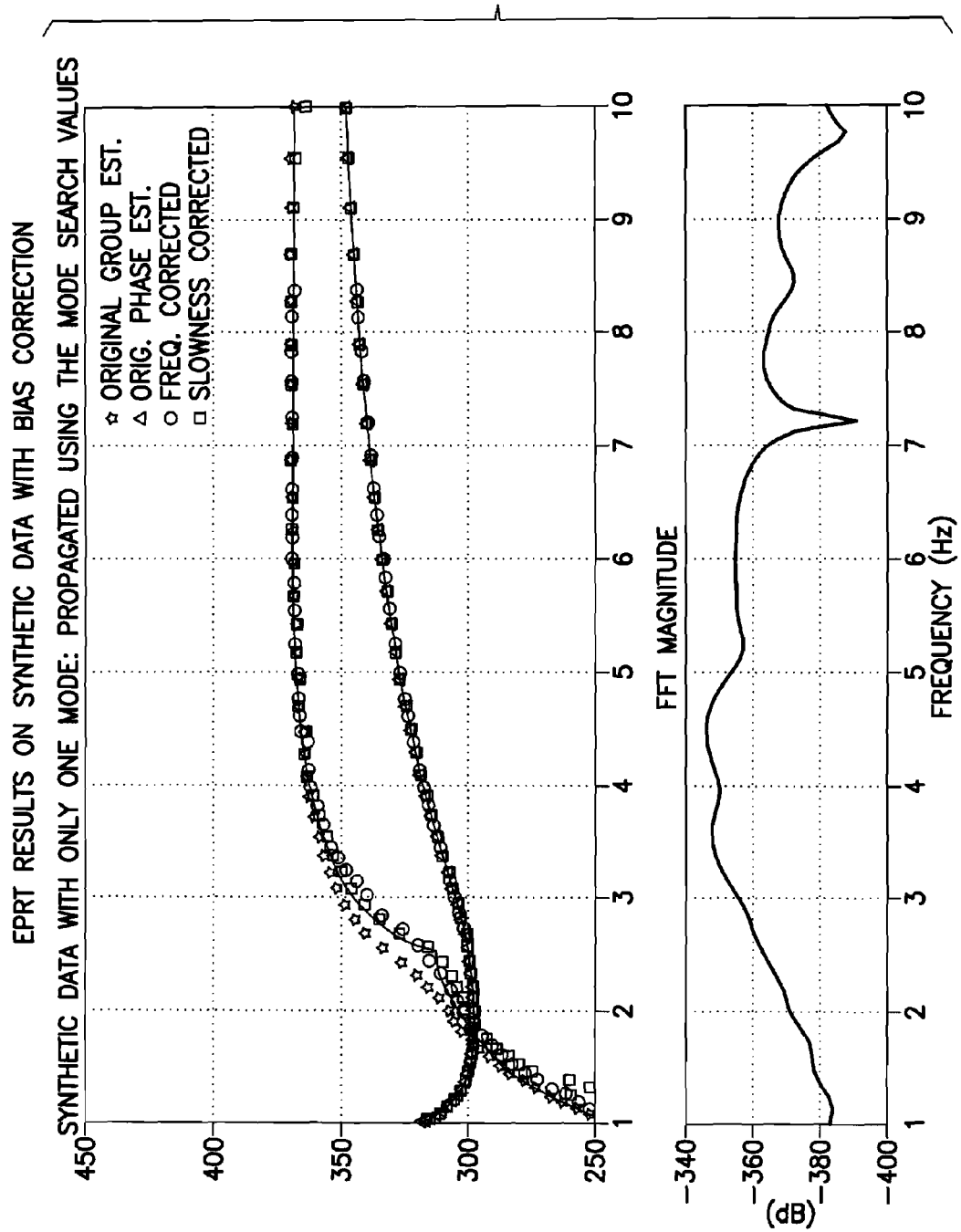
FIG. 10 illustrates the result of correcting for the bias in the group slowness estimate for synthetic data.

FIG. 10 shows an example of bias in the group slowness estimation in the region of large slowness variation and spectral asymmetry and its correction by both methods on a synthetic data example. The grey line shows the true value. Note that the support of the dispersion curve after frequency correction shrinks to 8.3 kHz under frequency correction. Also note that the phase estimates are relatively unaffected for this case.

Dispersion Curve Extraction

The techniques described above in connection with attenuation and slowness (group and phase) analysis at one scale of the array CWT for one mode can be extended to other scales (and corresponding central frequencies) to obtain an estimate of slowness for this mode as a function of frequency, i.e., the dispersion. However, such an approach can be computationally costly. An alternative approach exploits the dependency across scales arising from the continuity and smoothness of physical dispersion curves, the similar continuity across scales of the time frequency localization of the mode and the relationship of phase and group slowness. In particular, given the phase and group slowness at a certain scale, corresponding to $\omega_i$ where $\omega_i$ could refer either to the nominal center frequency, $2\pi f_a$ or to the spectral mean frequency $2\pi(f_a+f_\delta)$, it is possible to deduce the following relationship between the phase correction and the phase and group slowness at the frequency, $\omega_{i+1}$, using a Taylor series expansion $$\phi(\omega_{i+1}) = \omega_i s_\phi(\omega_i) + \frac{\omega_{i+1}+\omega_i}{2}s_g(\omega_i) + o(\omega_{i+1}-\omega_i) \qquad (95)$$

The above relationship can be used to limit the search over the phase and use the continuity of the modes in time and slowness across scales to likewise limit the search over the time and slowness domains. This not only results in the code being more efficient, but by employing this continuity to track across scales it is also possible to obtain improved accuracy and robustness in the estimates. The described embodiment therefore utilizes the approach of initializing the estimation by evaluating the time frequency map at a reference sensor (usually the last) where the best separation of the modes might be expected. On this map, a starting value of the frequency (scale) is chosen corresponding to maximum energy (dominant mode). A full search of the EPRT (over the candidate moveouts p) is carried out for this scale using time window locations around the time of maximum modulus. This yields estimates for the phase and group slowness at this frequency. The technique then "marches up" the frequency using the estimates from the previous steps to constrain the search in the present step. The marching (tracking) is an iterative increase (or decrease) which may be terminated based on testing the semblance against a threshold. After marching up, the technique "marches down" from the initial starting point, similarly terminating by comparing the semblance to a threshold (the order and timing of marching up versus down is not critical, and no limitation is implied). Note that it is now possible to extract dispersion curves for more than one mode using the same approach if they do not overlap in the time-frequency plane. After tracking the strongest mode, the process is re-initialized with the next strongest peak corresponding to the second mode and the process repeated to extract the corresponding dispersion curve. This process can be iterated until the significant modes that are disjoint on the time-frequency plane have been tracked and the corresponding dispersion curves extracted. In this regard, it is helpful to use the data association algorithm described above to track and correctly label the modulus peaks. FIG. 7 shows an example of using data association to track multiple modes on the time frequency plane.

Another use of data association could be to label the modes across sensors, fit a line to the estimated time locations as a function of sensor and use the slope therefrom to initialize the search over p over a small neighborhood of the fitted slope. This could lead to further savings in computation. However there may be an issue of whether the data association is always robust, e.g., when there are interfering modes nearby. This modification effectively uses the relatively light modulus method described previously to constrain the search while refining the estimates obtained therefrom. This process is illustrated in FIG. 4 and FIG. 5. Note that FIG. 5 also illustrates collecting the coefficients at a certain frequency (scale) into an array indexed by time and sensor.

Figure 11:
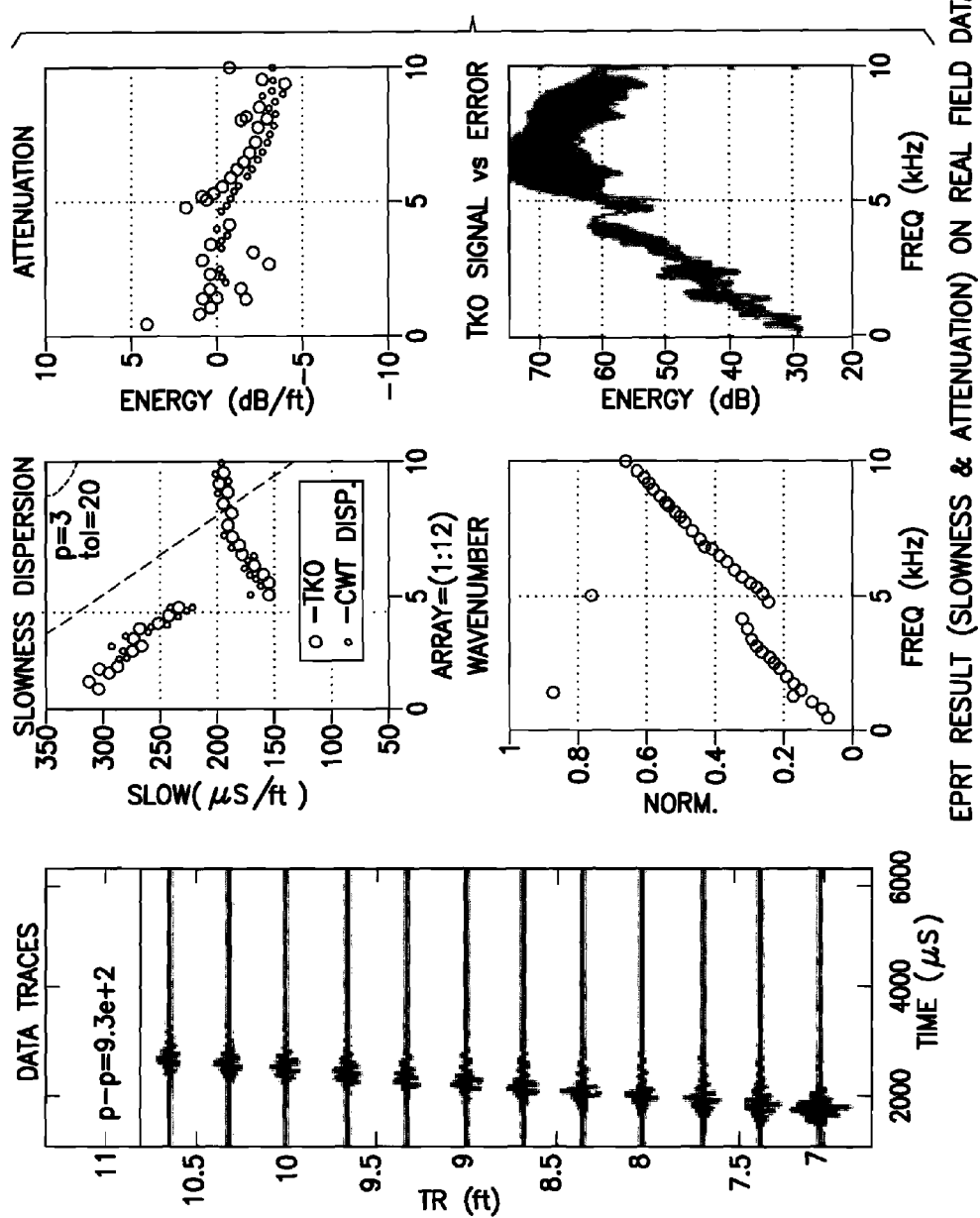
FIG. 11 illustrates the use of the EPRT method to generate estimates of phase slowness dispersion and attenuation on a frame of real oilfield data compared with the results from the Prony method.

An example of application of the EPRT method to real oilfield data is shown in FIG. 11, where it is compared to the existing matrix pencil method. It will be appreciated that the new method yields more stable and better estimates for both slowness and attenuation.

The above-described approach works for cases where the modes do not overlap in the time-frequency plane, though they could overlap in time or frequency. In practice, this should cover a majority of cases of interest. However, in some instance there is significant overlap of distinct modes in the time frequency plane. Another variation to possibly address that case is to use the reassigned scalogram described above to obtain a modified time-frequency (time-scale) map showing better definition and separation of the modes. It is then possible to apply the method described here, provided the reassignment operation removes the overlap. Methods to address the case of overlapping modes that are not separated in the reassigned scalogram will be described below.

Workflow

The EPRT workflow used in extracting the slowness and attenuation dispersion curve estimates is shown in FIG. 12. The steps are as follows:

1. Start with the waveforms collected by an array of at least two sensors.
2. Compute the continuous wavelet transform (CWT) coefficients for each waveform, generating a time-frequency (time-scale) map for a desired set of frequencies or scales (as shown in FIG. 4).
3. Select a reference sensor (preferably one which shows greatest separation between the modes of interest); on the corresponding CWT map, identify and track the separated modes across frequency a) Identify and obtain the time locus of each mode using a feature on the CWT map. Examples of such features include the peak of the absolute value or modulus (possibly after data fitting), onset defined as when the modulus first exceeds a threshold relative to the peak, locus of phase satisfying a given value near the modulus peak etc. FIG. 4 shows the peak locations.

b) Use data association to track these time loci across frequencies and thereby label the individual modes across frequency (as shown in FIG. 7).

Optionally repeat above for the waveform at each sensor. Then do data association across sensors of the modes labeled across frequency to identify and label them across sensors (as shown in FIG. 5).

1) For each of these labeled modes:
   a) Initiate the dispersion curve extraction at the frequency corresponding to the greatest energy for that mode.
   b) Collect the CWT coefficients at this initial frequency for the sensors into an array of data indexed by time and sensor (as shown in FIG. 5).
   c) Pick time windows (the window length is decided based on the frequency) centered on a set of time positions, t, in a local neighborhood of the time locus of the mode corresponding to the initial frequency.
   d) Pick a set of test moveouts, p, corresponding to the expected range of group slowness. If the labeling has been done across sensors in the optional step above, this set can be constrained by fitting a straight line through the corresponding time loci of the mode of interest for the sensors, computing its slope and choosing the set of test moveouts to be in the local neighborhood of this computed slope.
   e) For each of the test moveouts, shift and align the array of coefficient data corresponding to the moveout.
   f) For each of these aligned arrays, compute estimates of the exponential parameters, phase $\widetilde{\varphi}$ and attenuation, $\widetilde{\alpha}$, as described previously, for the data in each of time windows applied to the shifted data.
   g) Use these estimated exponential parameters to compute the EPRT semblance according to equation (66). Build up the map $\rho(t, p)$ and locate its maximum peak. The corresponding moveout is declared as the estimate $\hat{p}$.
   h) Use the estimate $\hat{p}$ as well as the corresponding values of $\widetilde{\varphi}$ and $\widetilde{\alpha}$ to compute the estimates of group and phase slowness and attenuation at this frequency as per equation (94).
   i) Alternatively, generate a map from the numerator of the semblance, corresponding to the energy of the projection, locate its peak and use the corresponding values of p, $\widetilde{\varphi}$ and $\widetilde{\alpha}$ to generate our dispersion estimates.

j) The dispersion curve estimation is then continued by marching up the frequency axis; moving onto the next higher selected frequency, collecting the CWT coefficients corresponding to it in a data array and repeating steps (4a) through (4i) above. The modification is that the search is now constrained over test moveouts, p, to lie in a certain neighborhood of the estimated value of p̂ at the previous frequency value. The phase estimates are also constrained to lie within a neighborhood of a predicted value based on previous estimates as per equation (95). If the computed phase estimate lies outside this interval, set the estimate to equal the interval endpoint closest to it.

k) This marching up process is terminated when the highest available frequency is reached, or when the maximum computed semblance falls below a specified threshold.

l) The process is repeated by marching down in frequency starting with the one below the initial frequency.

m) When done, a dispersion curve for this mode results. As a final step, apply the bias correction if desired. This could be either of the following:
   i) Frequency correction: Estimate the energy spectrum weighted frequency mean for the CWT coefficients in the window corresponding to the maximizing t and p values at each of the selected frequencies. Assign the group slowness and attenuation to these mean frequencies and re-compute the phase slowness estimates using these mean frequencies instead of the center frequencies as described before. This correction could also be performed in the marching steps above.
   ii) Slowness correction: Compute the energy spectrum weighted spectral moments—frequency mean, frequency variance (bandwidth squared) and skew (third moment) as per equation (90) for the CWT coefficients in the window corresponding to the maximizing t̂ and p̂ values at each of the selected frequencies. In addition, calculate the local slope after smoothing of the uncorrected group and attenuation estimates as a function of frequency. Use these derivative estimates along with the spectral moments to apply corrections to the slowness and attenuation estimates as per equation (92).

2) When done, the dispersion curve estimates are obtained over a subset of the processing frequency band for the phase and group slowness as well as the attenuation for each of the identified and labeled modes. These modes are assumed herein to be sufficiently separated on the time frequency map of the received to permit this labeling.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method of providing a dispersion curve for acoustic data comprising the steps of:
   using an analyzer unit to
   receive a time series of acoustic data associated with a plurality of sensors having different transmitter-receiver spacings;
   generate a plurality of time-frequency representations from the received time series;
   identify a characteristic feature in the time-frequency representations;
   select at least one frequency;
   define a kernel comprising:
      estimating a time location of the characteristic feature at the selected frequency;
      associating a corresponding characteristic feature for ones of the spacings at the selected frequency;
      fitting at least a segment of a line through at least some of the time locations of the associated characteristic features, plotted against the corresponding spacings;
      estimating group slowness at the selected frequency based at least in-part on an indication of fitted line segment slope;
      estimating a phase difference between sensors;
      estimating an attenuation between sensors;
      using the estimated phase difference and group slowness to estimate a phase slowness; and
   repeat the kernel for other frequencies of interest,
   obtain a dispersion curve comprising the group slowness, the phase
   slowness, and the attenuation as a function of frequency, and
   provide the dispersion curve in tangible form.

2. The method of claim 1 including the further step of using the analyzer unit to generate a time-frequency map by applying at least one step selected from the group including: a wavelet transform to the time series for each sensor; a Wigner Wille transform to the time series at each of the sensors; and a short time Fourier transform to the time series at each of the sensors.

3. The method of claim 1 wherein said characteristic feature is at least one of: a contour of peaks with respect to time of a complex modulus of a time freguency map; and a contour of a complex modulus of a time frequency map that equals a given threshold.

4. The method of claim 1 including the further step of using the analyzer unit to apply a reassigned scalogram operation to a time-frequency map.

5. A method of providing a dispersion curve for acoustic data comprising the steps of:
   using an analyzer unit to:
   receive a time series associated with a plurality of sensors;
   generate a time-frequency representation for each sensor;
   select a reference sensor;
   identify a characteristic feature in the time frequency representation for the reference sensor;
   estimate time locations across frequency of the characteristic feature;
   select an initial frequency at which energy is greater than a threshold value over the time locations;
   define a kernel comprising:
      collecting time frequency coefficients at the selected frequency for the sensors into a representation of data indexed by time and sensor;
      selecting time windows centered on a set of positions in a local neighborhood of the time location at the selected frequency;
      selecting a set of test moveouts for ones of the time windows corresponding to expected range of group slowness;
      shifting and aligning the representation of coefficient data in the window corresponding to the test moveout and window positions;

computing estimates of phase difference and attenuation across the representation of shifted and aligned data for the test moveouts and window positions;

using the estimated phase difference and attenuation to perform a modified stacking operation on the representation of shifted and aligned data for the test moveouts and window positions to produce an output representation for a plurality of values of time position and moveout;

finding a maximum peak of the output representation and using the corresponding moveout to estimate the group slowness;

using a corresponding value of the computed estimate of the phase difference along with the group slowness to generate an estimate of the phase slowness;

setting a corresponding value of the computed estimate of attenuation as an attenuation estimate;

iteratively increasing frequency from the selected initial frequency comprising selecting a higher frequency;

constraining the moveout based on the previous computed value of the group slowness;

repeating the kernel for the selected higher frequency until a final highest frequency is reached or when the maximum computed semblance falls below a specified threshold;

iteratively decreasing frequency from the selected initial frequency comprising selecting a lower frequency;

constraining the moveout based on the previous computed value of the group slowness;

repeat the kernel for the selected lower frequency until a final lowest frequency is reached or when the maximum computed semblance falls below a specified threshold;

obtain a dispersion curve comprising the group slowness, the phase slowness, and the attenuation as a function of frequency; and provide the dispersion curve in tangible form.

6. The method of claim 5 including the further steps of using the analyzer unit to:

estimate a bias correction; and the bias correction to the dispersion curve.

7. The method of claim 6 wherein the bias is at least one of: a frequency bias; and a slowness and attenuation bias.

8. The method of claim 5 including the further step of using the analyzer unit to generate a time-frequency map by applying a step selected from the group including: a wavelet transform to the time series at each of the sensors; a Wigner Wille transform to the time series at the of said sensors; and a short time Fourier transform to the time series at each of the sensors.

9. The method of claim 5 wherein said characteristic feature is at least one of: a contour of peaks with respect to time of a complex modulus of a time frequency map; and a contour of a complex modulus of a time frequency map that equals a given threshold.

10. The method of claim 5 wherein the window length is decided based on the frequency.

11. The method of claim 5 wherein the output representation is an output map indicative of at least one of: energy; and semblance.

12. The method of claim 5 further including the step of using the analyzer unit to apply a reassigned scalogram operation to a time-frequency map.

13. Apparatus for dispersion extraction for acoustic data comprising:

a sonic logging tool configured to generate a time series of acoustic data associated with a plurality of sensors having different transmitter-receiver spacings;

an analyzer unit configured to:

generate a plurality of time-frequency representations from the time series;

identify a characteristic feature in the time-frequency representations;

select at least one frequency;

define a kernel, including:

estimating a time location of the characteristic feature at the selected frequency;

associating the corresponding characteristic feature for ones of the spacings at the selected frequency;

fitting at least a segment of a line through at least some of the time locations of the associated characteristic features;

estimating group slowness at the selected frequency based at least in-part on slope of the fitted line segment;

estimating a phase difference between sensors;

estimating attenuation between the sensors;

using the estimated phase difference and group slowness to estimate the phase slowness; and repeating the kernel for other frequencies of interest, obtaining a dispersion curve comprising the group slowness, the phase slowness, and the attenuation as a function of frequency, and storing the dispersion curve in memory.

14. The apparatus of claim 13 wherein the analyzer unit is further operable to generate a time-frequency map by applying at least one of: a wavelet transform to the time series for each sensor; a Wigner Wille transform to the time series at each of the sensors; and a short time Fourier transform to the time series at each of the sensors.

15. The apparatus of claim 13 wherein said characteristic feature is at least one of: a contour of peaks with respect to time of a complex modulus of a time frequency map; and a contour of a complex modulus of a time frequency map that equals a given threshold.

16. The apparatus of claim 13 wherein the analyzer unit is further operable to apply a reassigned scalogram operation to a time-frequency map.

17. Apparatus for dispersion extraction for acoustic data comprising:

a sonic logging tool configured to generate a time series associated with a plurality of sensors;

an analyzer unit configured to:

generate a time-frequency representation for ones of the sensors;

select a reference sensor;

identify a characteristic feature in the time frequency representation for the reference sensor;

determine time locations across frequency of the characteristic feature;

select an initial frequency at which energy is maximum over the time locations;

define a kernel, including:

collecting time frequency coefficients at the selected frequency for ones of the sensors into a representation of data indexed by time and sensor;

selecting time windows centered on a set of positions in a local neighborhood of the time location at the selected frequency;

selecting a set of test moveouts for ones of the time windows corresponding to expected range of group slowness;

shifting and aligning the representation of coefficient data in the window corresponding to ones of the test moveout and window positions;

computing estimates of phase difference and attenuation across the representation of shifted and aligned data for ones of the test moveouts and window positions;

using the estimated phase difference and attenuation to perform a modified stacking operation on the representation of shifted and aligned data for ones of the test moveouts and window positions to produce an output representation for values of time position and moveout;

finding a maximum peak of the output representation and using a corresponding moveout to estimate group slowness;

using a corresponding value of the computed estimate of the phase along with group slowness to generate an estimate of phase slowness;

setting a corresponding value of the computed estimate of attenuation as an attenuation estimate;

iteratively increasing frequency from the selected initial frequency comprising selecting a higher frequency;

constraining the moveout based on the previous computed value of the group slowness;

repeating the kernel for the selected higher frequency until a final highest frequency is reached or when the maximum computed semblance falls below a specified threshold;

iteratively decreasing frequency from the selected initial frequency comprising selecting a lower frequency;

constraining the moveout based on the previous computed value of the group slowness;

repeating the kernel for the selected lower frequency until a final lowest frequency is reached or when the maximum computed semblance falls below a specified threshold;

obtaining a dispersion curve comprising the group slowness, the phase slowness, and the attenuation as a function of frequency; and storing the dispersion curve in memory.

18. The apparatus of claim 17 wherein the analyzer unit is further operable to:

determine a bias correction; and apply the bias correction to the dispersion curve.

19. The apparatus of claim 18 wherein the bias is at least one of: a frequency bias; and a slowness and attenuation bias.

20. The apparatus of claim 17 wherein the analyzer unit is further operable to generate a time-frequency map by applying at least one of: a wavelet transform to the time series at each of the sensors; a Wigner Wille transform to the time series at each of the sensors; and a short time Fourier transform to the time series at each of the sensors.

21. The apparatus of claim 17 wherein said characteristic feature is at least one of: a peak with respect to time of a complex modulus of a time frequency map; and a contour of a complex modulus of a time frequency map that equals a given threshold.

22. The apparatus of claim 17 wherein the window length is decided based on the frequency.

23. The apparatus of claim 17 wherein the output representation is an output map indicative of at least one of: energy; and semblance.

24. The apparatus of claim 17 wherein the analyzer unit is further operable to apply a reassigned scalogram operation to a time-frequency map.

* * * * *